United States Patent
Jain et al.

(10) Patent No.: US 10,911,234 B2
(45) Date of Patent: Feb. 2, 2021

(54) SYSTEM AND METHOD FOR A TOKEN GATEWAY ENVIRONMENT

(71) Applicant: Experian Information Solutions, Inc., Costa Mesa, CA (US)

(72) Inventors: Alpa Modi Jain, Laguna Niguel, CA (US); Praveen Kumar Soni, Costa Mesa, CA (US); Frederic Vander Elst, London (GB)

(73) Assignee: Experian Information Solutions, Inc., Costa Mesa, CA (US)

( * ) Notice: Subject to any disclaimer, the term of this patent is extended or adjusted under 35 U.S.C. 154(b) by 310 days.

(21) Appl. No.: 16/051,339

(22) Filed: Jul. 31, 2018

(65) Prior Publication Data

US 2019/0394041 A1 Dec. 26, 2019

Related U.S. Application Data

(60) Provisional application No. 62/688,887, filed on Jun. 22, 2018.

(51) Int. Cl.
*H04L 9/32* (2006.01)
*H04L 29/06* (2006.01)
*H04L 9/08* (2006.01)

(52) U.S. Cl.
CPC .......... *H04L 9/3213* (2013.01); *H04L 9/0894* (2013.01); *H04L 9/3247* (2013.01);
(Continued)

(58) Field of Classification Search
None
See application file for complete search history.

(56) References Cited

U.S. PATENT DOCUMENTS

| 3,752,904 A | 8/1973 | Waterbury |
| 4,795,890 A | 1/1989 | Goldman |

(Continued)

FOREIGN PATENT DOCUMENTS

| CN | 104877993 | 9/2015 |
| EP | 1 028 401 | 8/2000 |

(Continued)

OTHER PUBLICATIONS

Sakimura et al.; OpenID Connect Core 1.0 incorporating errata set 1; 2014; Retrieved from the Internet https://openid.net/specs/openid-connect-core-1_0.html; pp. 1-78, as printed. (Year: 2014).*

(Continued)

*Primary Examiner* — Saleh Najjar
*Assistant Examiner* — Michael W Chao
(74) *Attorney, Agent, or Firm* — Knobbe, Martens, Olson & Bear, LLP

(57) ABSTRACT

Embodiments include a method for providing tokens which includes: receiving from a user system an encrypted data packet including user credentials and a request for an authentication token to access protected resources; extracting the user's security information; transmitting a data packet to a security and access management system, where the data packet includes the user's security information and a request for user validation; receiving, from the security and access management system, user validation and additional data; generating a thin token and a fat token; storing the thin token in association with the fat token; transmitting the thin token to the user system; receiving, from the user system, a request to access protected resources from a protected resource system, the request including the thin token; validating the received thin token; accessing the fat token associated with the thin token; and transmitting the fat token to the protected resource system.

20 Claims, 8 Drawing Sheets

(52) U.S. Cl.
CPC .......... H04L 63/0428 (2013.01); H04L 63/08 (2013.01); H04L 63/10 (2013.01); H04L 63/0807 (2013.01); H04L 63/0815 (2013.01)

(56) References Cited

U.S. PATENT DOCUMENTS

| | | | |
|---|---|---|---|
| 4,891,503 A | 1/1990 | Jewell | |
| 4,977,595 A | 12/1990 | Ohta et al. | |
| 4,989,141 A | 1/1991 | Lyons et al. | |
| 5,126,936 A | 6/1992 | Champion et al. | |
| 5,351,293 A | 9/1994 | Michener et al. | |
| 5,590,038 A | 12/1996 | Pitroda | |
| 5,640,577 A | 6/1997 | Scharmer | |
| 5,659,725 A | 8/1997 | Levy et al. | |
| 5,659,731 A | 8/1997 | Gustafson | |
| 5,715,314 A | 2/1998 | Payne et al. | |
| 5,719,941 A | 2/1998 | Swift et al. | |
| 5,748,098 A | 5/1998 | Grace | |
| 5,754,632 A | 5/1998 | Smith | |
| 5,828,840 A | 10/1998 | Cowan et al. | |
| 5,832,068 A | 11/1998 | Smith | |
| 5,844,218 A | 12/1998 | Kawan et al. | |
| 5,866,889 A | 2/1999 | Weiss et al. | |
| 5,881,131 A | 3/1999 | Farris et al. | |
| 5,903,830 A | 5/1999 | Joao et al. | |
| 5,913,196 A | 6/1999 | Talmor et al. | |
| 5,956,693 A | 9/1999 | Geerlings | |
| 5,966,695 A | 10/1999 | Melchione et al. | |
| 5,999,596 A | 12/1999 | Walker et al. | |
| 6,021,397 A | 2/2000 | Jones et al. | |
| 6,021,943 A | 2/2000 | Chastain | |
| 6,026,440 A | 2/2000 | Shrader et al. | |
| 6,038,551 A | 3/2000 | Barlow et al. | |
| 6,055,570 A | 4/2000 | Nielsen | |
| 6,069,941 A | 5/2000 | Byrd et al. | |
| 6,072,894 A | 6/2000 | Payne | |
| 6,073,106 A | 6/2000 | Rozen et al. | |
| 6,073,140 A | 6/2000 | Morgan et al. | |
| 6,085,242 A | 7/2000 | Chandra | |
| 6,119,103 A | 9/2000 | Basch et al. | |
| 6,128,602 A | 10/2000 | Northington et al. | |
| 6,157,707 A | 12/2000 | Baulier et al. | |
| 6,161,139 A | 12/2000 | Win et al. | |
| 6,182,068 B1 | 1/2001 | Culliss | |
| 6,182,219 B1 | 1/2001 | Feldbau et al. | |
| 6,182,229 B1 | 1/2001 | Nielsen | |
| 6,196,460 B1 | 3/2001 | Shin | |
| 6,233,588 B1 | 5/2001 | Marchoili et al. | |
| 6,247,000 B1 | 6/2001 | Hawkins et al. | |
| 6,253,202 B1 | 6/2001 | Gilmour | |
| 6,254,000 B1 | 7/2001 | Degen et al. | |
| 6,263,447 B1 | 7/2001 | French et al. | |
| 6,269,369 B1 | 7/2001 | Robertson | |
| 6,282,658 B2 | 8/2001 | French et al. | |
| 6,292,795 B1 | 9/2001 | Peters et al. | |
| 6,311,169 B2 | 10/2001 | Duhon | |
| 6,321,339 B1 | 11/2001 | French et al. | |
| 6,327,578 B1 | 12/2001 | Linehan | |
| 6,343,279 B1 | 1/2002 | Bissonette et al. | |
| 6,356,937 B1 | 3/2002 | Montville et al. | |
| 6,397,212 B1 | 5/2002 | Biffar | |
| 6,453,353 B1 | 9/2002 | Win et al. | |
| 6,457,012 B1 | 9/2002 | Jatkowski | |
| 6,463,533 B1 | 10/2002 | Calamera et al. | |
| 6,473,740 B2 | 10/2002 | Cockril et al. | |
| 6,496,936 B1 | 12/2002 | French et al. | |
| 6,510,415 B1 | 1/2003 | Talmor et al. | |
| 6,523,021 B1 | 2/2003 | Monberg et al. | |
| 6,523,041 B1 | 2/2003 | Morgan et al. | |
| 6,539,377 B1 | 3/2003 | Culliss | |
| 6,564,210 B1 | 5/2003 | Korda et al. | |
| 6,571,334 B1 | 5/2003 | Feldbau et al. | |
| 6,574,736 B1 | 6/2003 | Andrews | |
| 6,581,059 B1 | 6/2003 | Barrett et al. | |
| 6,601,173 B1 | 7/2003 | Mohler | |
| 6,607,136 B1 | 8/2003 | Atsmon et al. | |
| 6,622,131 B1 | 9/2003 | Brown et al. | |
| 6,629,245 B1 | 9/2003 | Stone et al. | |
| 6,647,383 B1 | 11/2003 | August et al. | |
| 6,658,393 B1 | 12/2003 | Basch et al. | |
| 6,679,425 B1 | 1/2004 | Sheppard et al. | |
| 6,714,944 B1 | 3/2004 | Shapiro et al. | |
| 6,725,381 B1 | 4/2004 | Smith et al. | |
| 6,734,886 B1 | 5/2004 | Hagan et al. | |
| 6,750,985 B2 | 6/2004 | Rhoads | |
| 6,754,665 B1 | 6/2004 | Futagami et al. | |
| 6,766,327 B2 | 7/2004 | Morgan, Jr. et al. | |
| 6,766,946 B2 | 7/2004 | Iida et al. | |
| 6,782,379 B2 | 8/2004 | Lee | |
| 6,795,812 B1 | 9/2004 | Lent et al. | |
| 6,796,497 B2 | 9/2004 | Benkert et al. | |
| 6,804,346 B1 | 10/2004 | Mewhinney | |
| 6,805,287 B2 | 10/2004 | Bishop et al. | |
| 6,816,850 B2 | 11/2004 | Culliss | |
| 6,816,871 B2 | 11/2004 | Lee | |
| 6,823,319 B1 | 11/2004 | Lynch et al. | |
| 6,829,711 B1 | 12/2004 | Kwok et al. | |
| 6,845,448 B1 | 1/2005 | Chaganti et al. | |
| 6,857,073 B2 | 2/2005 | French et al. | |
| 6,871,287 B1 | 3/2005 | Ellingson | |
| 6,892,307 B1 | 5/2005 | Wood et al. | |
| 6,900,731 B2 | 5/2005 | Kreiner et al. | |
| 6,907,408 B2 | 6/2005 | Angel | |
| 6,908,030 B2 | 6/2005 | Rajasekaran et al. | |
| 6,910,624 B1 | 6/2005 | Natsuno | |
| 6,920,435 B2 | 7/2005 | Hoffman et al. | |
| 6,928,487 B2 | 8/2005 | Eggebraaten et al. | |
| 6,934,714 B2 | 8/2005 | Meinig | |
| 6,934,849 B2 | 8/2005 | Kramer et al. | |
| 6,934,858 B2 | 8/2005 | Woodhill | |
| 6,947,989 B2 | 9/2005 | Gullotta et al. | |
| 6,950,807 B2 | 9/2005 | Brock | |
| 6,950,809 B2 | 9/2005 | Dahan et al. | |
| 6,950,858 B2 | 9/2005 | Ogami | |
| 6,965,881 B1 | 11/2005 | Brickell et al. | |
| 6,968,319 B1 | 11/2005 | Remington et al. | |
| 6,973,462 B2 | 12/2005 | Dattero et al. | |
| 6,983,381 B2 | 1/2006 | Jerdonek | |
| 6,985,887 B1 | 1/2006 | Sunstein et al. | |
| 6,986,461 B1 | 1/2006 | Geoghegan et al. | |
| 6,988,085 B2 | 1/2006 | Hedy | |
| 6,993,596 B2 | 1/2006 | Hinton et al. | |
| 6,999,941 B1 | 2/2006 | Agarwal | |
| 7,016,907 B2 | 3/2006 | Boreham et al. | |
| 7,028,013 B2 | 4/2006 | Saeki | |
| 7,028,052 B2 | 4/2006 | Chapman et al. | |
| 7,039,607 B2 | 5/2006 | Watarai et al. | |
| 7,043,476 B2 | 5/2006 | Robson | |
| 7,058,817 B1 | 6/2006 | Ellmore | |
| 7,059,531 B2 | 6/2006 | Beenau et al. | |
| 7,062,475 B1 | 6/2006 | Szabo et al. | |
| 7,076,462 B1 | 7/2006 | Nelson et al. | |
| 7,085,727 B2 | 8/2006 | VanOrman | |
| 7,089,584 B1 * | 8/2006 | Sharma | G06F 21/335 709/203 |
| 7,107,241 B1 | 9/2006 | Pinto | |
| 7,117,172 B1 | 10/2006 | Black | |
| 7,121,471 B2 | 10/2006 | Beenau et al. | |
| 7,124,144 B2 | 10/2006 | Christianson et al. | |
| 7,154,375 B2 | 12/2006 | Beenau et al. | |
| 7,155,739 B2 | 12/2006 | Bari et al. | |
| 7,174,454 B2 | 2/2007 | Roskind | |
| 7,177,846 B2 | 2/2007 | Moenickheim et al. | |
| 7,194,416 B1 | 3/2007 | Provost et al. | |
| 7,200,602 B2 | 4/2007 | Jonas | |
| 7,203,653 B1 | 4/2007 | McIntosh | |
| 7,209,895 B2 | 4/2007 | Kundtz et al. | |
| 7,219,107 B2 | 5/2007 | Beringer | |
| 7,222,369 B2 | 5/2007 | Vering et al. | |
| 7,225,464 B2 | 5/2007 | Satyavolu et al. | |
| 7,231,657 B2 | 6/2007 | Honarvar et al. | |
| 7,234,156 B2 | 6/2007 | French et al. | |
| 7,234,160 B2 | 6/2007 | Vogel et al. | |
| 7,237,267 B2 | 6/2007 | Rayes et al. | |

(56) References Cited

U.S. PATENT DOCUMENTS

| | | |
|---|---|---|
| 7,240,199 B2 | 7/2007 | Tomkow |
| 7,243,369 B2 | 7/2007 | Bhat et al. |
| 7,246,067 B2 | 7/2007 | Austin et al. |
| 7,246,740 B2 | 7/2007 | Swift et al. |
| 7,249,113 B1 | 7/2007 | Continelli et al. |
| 7,263,497 B1 | 8/2007 | Wiser et al. |
| 7,289,971 B1 | 10/2007 | O'Neil et al. |
| 7,303,120 B2 | 12/2007 | Beenau et al. |
| 7,310,611 B2 | 12/2007 | Shibuya et al. |
| 7,314,167 B1 | 1/2008 | Kiliccote |
| 7,328,233 B2 | 2/2008 | Salim et al. |
| 7,330,871 B2 | 2/2008 | Barber |
| 7,333,635 B2 | 2/2008 | Tsantes et al. |
| 7,337,468 B2 | 2/2008 | Metzger |
| 7,340,042 B2 | 3/2008 | Cluff et al. |
| 7,340,679 B2 | 3/2008 | Botscheck et al. |
| 7,343,149 B2 | 3/2008 | Benco |
| 7,343,295 B2 | 3/2008 | Pomerance |
| 7,356,503 B1 | 4/2008 | Johnson et al. |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,383,988 B2 | 6/2008 | Slonecker, Jr. |
| 7,386,448 B1 | 6/2008 | Poss et al. |
| 7,389,913 B2 | 6/2008 | Starrs |
| 7,403,942 B1 | 7/2008 | Bayliss |
| 7,421,732 B2 | 9/2008 | Costa-Requena et al. |
| 7,433,864 B2 | 10/2008 | Malik |
| 7,437,679 B2 | 10/2008 | Uemura et al. |
| 7,438,226 B2 | 10/2008 | Helsper et al. |
| 7,444,414 B2 | 10/2008 | Foster et al. |
| 7,444,518 B1 | 10/2008 | Dharmarajan et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,467,401 B2 | 12/2008 | Cicchitto |
| 7,478,157 B2 | 1/2009 | Bohrer et al. |
| 7,480,631 B1 | 1/2009 | Merced et al. |
| 7,490,356 B2 | 2/2009 | Lieblich et al. |
| 7,503,489 B2 | 3/2009 | Heffez |
| 7,509,117 B2 | 3/2009 | Yum |
| 7,509,278 B2 | 3/2009 | Jones |
| 7,512,221 B2 | 3/2009 | Toms |
| 7,519,558 B2 | 4/2009 | Ballard et al. |
| 7,526,796 B2 | 4/2009 | Lulich et al. |
| 7,529,698 B2 | 5/2009 | Joao |
| 7,530,097 B2 | 5/2009 | Casco-Arias et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,080 B1 | 6/2009 | Willard et al. |
| 7,552,123 B2 | 6/2009 | Wade et al. |
| 7,552,467 B2 | 6/2009 | Lindsay |
| 7,555,459 B2 | 6/2009 | Dhar et al. |
| 7,562,184 B2 | 7/2009 | Henmi et al. |
| 7,562,814 B1 | 7/2009 | Shao et al. |
| 7,566,002 B2 | 7/2009 | Love et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,587,366 B2 | 9/2009 | Grim, III et al. |
| 7,587,368 B2 | 9/2009 | Felsher |
| 7,603,701 B2 | 10/2009 | Gaucas |
| 7,606,401 B2 | 10/2009 | Hoffman et al. |
| 7,606,725 B2 | 10/2009 | Robertson et al. |
| 7,610,216 B1 | 10/2009 | May et al. |
| 7,613,600 B2 | 11/2009 | Krane |
| 7,620,596 B2 | 11/2009 | Knudson et al. |
| 7,623,844 B2 | 11/2009 | Herrmann et al. |
| 7,630,932 B2 | 12/2009 | Danaher et al. |
| 7,634,737 B2 | 12/2009 | Beringer et al. |
| 7,636,941 B2 | 12/2009 | Blinn et al. |
| 7,641,113 B1 | 1/2010 | Alvarez et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,657,431 B2 | 2/2010 | Hayakawa |
| 7,660,989 B2 | 2/2010 | Tomkow |
| 7,672,833 B2 | 3/2010 | Blume et al. |
| 7,676,834 B2 | 3/2010 | Camaisa et al. |
| 7,685,096 B2 | 3/2010 | Margolus et al. |
| 7,685,209 B1 | 3/2010 | Norton et al. |
| 7,686,214 B1 | 3/2010 | Shao et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,698,558 B2 | 4/2010 | Tomkow |
| 7,707,271 B2 | 4/2010 | Rudkin et al. |
| 7,707,624 B2 | 4/2010 | Tomkow |
| 7,708,190 B2 | 5/2010 | Brandt et al. |
| 7,711,635 B2 | 5/2010 | Steele et al. |
| 7,725,385 B2 | 5/2010 | Royer et al. |
| 7,730,078 B2 | 6/2010 | Schwabe et al. |
| 7,739,139 B2 | 6/2010 | Robertson et al. |
| 7,747,494 B1 | 6/2010 | Kothari et al. |
| 7,747,520 B2 | 6/2010 | Livermore et al. |
| 7,747,521 B2 | 6/2010 | Serio |
| 7,761,384 B2 | 7/2010 | Madhogarhia |
| 7,761,568 B1 | 7/2010 | Levi et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,769,998 B2 | 8/2010 | Lynch et al. |
| 7,774,270 B1 | 8/2010 | MacCloskey |
| 7,788,040 B2 | 8/2010 | Haskell et al. |
| 7,792,715 B1 | 9/2010 | Kasower |
| 7,792,725 B2 | 9/2010 | Booraem et al. |
| 7,793,835 B1 | 9/2010 | Coggeshall et al. |
| 7,797,725 B2 | 9/2010 | Lunt et al. |
| 7,801,828 B2 | 9/2010 | Candella et al. |
| 7,801,956 B1 | 9/2010 | Cumberbatch et al. |
| 7,802,104 B2 | 9/2010 | Dickinson |
| 7,810,036 B2 | 10/2010 | Bales et al. |
| 7,818,228 B1 | 10/2010 | Coulter |
| 7,827,115 B2 | 11/2010 | Weller et al. |
| 7,841,004 B1 | 11/2010 | Balducci et al. |
| 7,841,008 B1 | 11/2010 | Cole et al. |
| 7,844,520 B1 | 11/2010 | Franklin |
| 7,849,014 B2 | 12/2010 | Erikson |
| 7,849,624 B2 | 12/2010 | Holt et al. |
| 7,853,493 B2 | 12/2010 | DeBie et al. |
| 7,853,533 B2 | 12/2010 | Eisen |
| 7,853,984 B2 | 12/2010 | Antell et al. |
| 7,865,557 B2 | 1/2011 | Tomkow |
| 7,865,958 B2 | 1/2011 | Lieblich et al. |
| 7,870,078 B2 | 1/2011 | Clark et al. |
| 7,877,304 B1 | 1/2011 | Coulter |
| 7,877,784 B2 | 1/2011 | Chow et al. |
| 7,880,728 B2 | 2/2011 | de los Reyes et al. |
| 7,886,008 B2 | 2/2011 | Tomkow et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,930,285 B2 | 4/2011 | Abraham et al. |
| 7,930,411 B1 | 4/2011 | Hayward |
| 7,941,324 B1 | 5/2011 | Sholtis |
| 7,958,046 B2 | 6/2011 | Doerner et al. |
| 7,966,192 B2 | 6/2011 | Pagliari et al. |
| 7,966,372 B1 | 6/2011 | Tomkow |
| 7,970,679 B2 | 6/2011 | Kasower |
| 7,975,299 B1 | 7/2011 | Balducci et al. |
| 7,979,908 B2 | 7/2011 | Millwee |

(56) References Cited

U.S. PATENT DOCUMENTS

| | | |
|---|---|---|
| 7,983,932 B2 | 7/2011 | Kane |
| 7,983,979 B2 | 7/2011 | Holland, IV |
| 7,991,688 B2 | 8/2011 | Phelan et al. |
| 8,001,153 B2 | 8/2011 | Skurtovich, Jr. et al. |
| 8,001,235 B2 | 8/2011 | Russ et al. |
| 8,005,155 B1 | 8/2011 | Lee et al. |
| 8,011,582 B2 | 9/2011 | Ghafarzadeh |
| 8,032,932 B2 | 10/2011 | Speyer et al. |
| 8,037,097 B2 | 10/2011 | Guo et al. |
| 8,041,956 B1 | 10/2011 | White et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,078,453 B2 | 12/2011 | Shaw |
| 8,078,524 B2 | 12/2011 | Crawford et al. |
| 8,078,881 B1 | 12/2011 | Liu |
| 8,079,070 B2 | 12/2011 | Camaisa et al. |
| 8,099,341 B2 | 1/2012 | Varghese |
| 8,104,679 B2 | 1/2012 | Brown |
| 8,116,731 B2 | 2/2012 | Buhrmann et al. |
| 8,116,751 B2 | 2/2012 | Aaron |
| 8,127,982 B1 | 3/2012 | Casey et al. |
| 8,127,986 B1 | 3/2012 | Taylor et al. |
| 8,131,777 B2 | 3/2012 | McCullouch |
| 8,151,327 B2 | 4/2012 | Eisen |
| 8,161,104 B2 | 4/2012 | Tomkow |
| 8,172,132 B2 | 5/2012 | Love et al. |
| 8,175,889 B1 | 5/2012 | Girulat et al. |
| 8,185,747 B2 | 5/2012 | Wood et al. |
| 8,190,513 B2 | 5/2012 | Felger |
| 8,195,549 B2 | 6/2012 | Kasower |
| 8,209,389 B2 | 6/2012 | Tomkow |
| 8,219,771 B2 | 7/2012 | Le Neel |
| 8,219,822 B2 | 7/2012 | Carnaisa et al. |
| 8,224,723 B2 | 7/2012 | Bosch et al. |
| 8,224,913 B2 | 7/2012 | Tomkow |
| 8,225,395 B2 | 7/2012 | Atwood et al. |
| 8,229,810 B2 | 7/2012 | Butera et al. |
| 8,229,844 B2 | 7/2012 | Felger |
| 8,234,498 B2 | 7/2012 | Britti et al. |
| 8,239,677 B2 | 8/2012 | Colson |
| 8,239,929 B2 | 8/2012 | Kwan et al. |
| 8,241,369 B2 | 8/2012 | Stevens |
| 8,244,848 B1 | 8/2012 | Narayanan et al. |
| 8,255,452 B2 | 8/2012 | Piliouras |
| 8,255,971 B1 | 8/2012 | Webb et al. |
| 8,260,706 B2 | 9/2012 | Freishtat et al. |
| 8,261,334 B2 | 9/2012 | Hazlehurst et al. |
| 8,266,065 B2 | 9/2012 | Dilip et al. |
| 8,275,845 B2 | 9/2012 | Tomkow |
| 8,280,348 B2 | 10/2012 | Snyder et al. |
| 8,281,372 B1 | 10/2012 | Vidal |
| 8,285,613 B1 | 10/2012 | Coulter |
| 8,285,656 B1 | 10/2012 | Chang et al. |
| 8,291,218 B2 | 10/2012 | Garcia et al. |
| 8,291,477 B2 | 10/2012 | Lunt |
| 8,295,898 B2 | 10/2012 | Ashfield et al. |
| 8,296,562 B2 | 10/2012 | Williams et al. |
| 8,302,164 B2 | 10/2012 | Lunt |
| 8,312,033 B1 | 11/2012 | McMillan |
| 8,315,940 B2 | 11/2012 | Winbom et al. |
| 8,327,429 B2 | 12/2012 | Speyer et al. |
| 8,359,278 B2 | 1/2013 | Domenikos et al. |
| 8,359,393 B2 | 1/2013 | Metzger |
| 8,374,634 B2 | 2/2013 | Dankar et al. |
| 8,374,973 B2 | 2/2013 | Herbrich et al. |
| 8,406,736 B2 | 3/2013 | Das et al. |
| 8,423,648 B2 | 4/2013 | Ferguson et al. |
| 8,442,886 B1 | 5/2013 | Haggerty et al. |
| 8,442,910 B2 | 5/2013 | Morris et al. |
| 8,443,202 B2 | 5/2013 | White et al. |
| 8,447,016 B1 | 5/2013 | Kugler et al. |
| 8,456,293 B1 | 6/2013 | Trundle et al. |
| 8,464,939 B1 | 6/2013 | Taylor et al. |
| 8,468,090 B2 | 6/2013 | Lesandro et al. |
| 8,468,198 B2 | 6/2013 | Tomkow |
| 8,468,199 B2 | 6/2013 | Tomkow |
| 8,478,674 B1 | 7/2013 | Kapczynski et al. |
| 8,478,981 B2 | 7/2013 | Khan et al. |
| 8,484,186 B1 | 7/2013 | Kapczynski et al. |
| 8,484,706 B2 | 7/2013 | Tomkow |
| 8,504,628 B2 | 8/2013 | Tomkow |
| 8,515,828 B1 | 8/2013 | Wolf et al. |
| 8,515,844 B2 | 8/2013 | Kasower |
| 8,527,357 B1 | 9/2013 | Ganesan |
| 8,527,417 B2 | 9/2013 | Telle et al. |
| 8,527,773 B1 | 9/2013 | Metzger |
| 8,528,078 B2 | 9/2013 | Camaisa et al. |
| 8,533,118 B2 | 9/2013 | Weller et al. |
| 8,533,791 B2 | 9/2013 | Samuelsson et al. |
| 8,549,590 B1 | 10/2013 | de Villiers Prichard et al. |
| 8,560,381 B2 | 10/2013 | Green et al. |
| 8,572,391 B2 | 10/2013 | Golan et al. |
| 8,578,496 B1 | 11/2013 | Krishnappa |
| 8,588,748 B2 | 11/2013 | Buhrman et al. |
| 8,600,886 B2 | 12/2013 | Ramavarjula et al. |
| 8,601,602 B1 | 12/2013 | Zheng |
| 8,606,234 B2 | 12/2013 | Pei et al. |
| 8,606,694 B2 | 12/2013 | Campbell et al. |
| 8,630,938 B2 | 1/2014 | Cheng et al. |
| 8,645,275 B2 | 2/2014 | Seifert et al. |
| 8,646,051 B2 | 2/2014 | Paden et al. |
| 8,656,504 B2 | 2/2014 | Lurey et al. |
| 8,671,115 B2 | 3/2014 | Skurtovich, Jr. et al. |
| 8,688,543 B2 | 4/2014 | Dominguez |
| 8,689,311 B2 * | 4/2014 | Blinn ................ H04L 63/0815 726/10 |
| 8,695,105 B2 | 4/2014 | Mahendrakar et al. |
| 8,701,199 B1 | 4/2014 | Dotan et al. |
| 8,705,718 B2 | 4/2014 | Baniak et al. |
| 8,706,599 B1 | 4/2014 | Koenig et al. |
| 8,725,613 B1 | 5/2014 | Celka et al. |
| 8,738,934 B2 | 5/2014 | Lurey et al. |
| 8,744,956 B1 | 6/2014 | DiChiara et al. |
| 8,751,388 B1 | 6/2014 | Chapa |
| 8,768,914 B2 | 7/2014 | Scriffignano et al. |
| 8,769,614 B1 | 7/2014 | Knox et al. |
| 8,781,882 B1 | 7/2014 | Arboletti et al. |
| 8,781,953 B2 | 7/2014 | Kasower |
| 8,781,975 B2 | 7/2014 | Bennett et al. |
| 8,782,154 B2 | 7/2014 | Tomkow |
| 8,782,217 B1 | 7/2014 | Arone et al. |
| 8,782,753 B2 | 7/2014 | Lunt |
| 8,793,166 B2 | 7/2014 | Mizhen |
| 8,793,509 B1 * | 7/2014 | Nelson ................ H04L 63/105 713/193 |
| 8,793,777 B2 | 7/2014 | Colson |
| 8,800,005 B2 | 8/2014 | Lunt |
| 8,806,584 B2 | 8/2014 | Lunt |
| 8,818,888 B1 | 8/2014 | Kapczynski et al. |
| 8,819,793 B2 | 8/2014 | Gottschalk, Jr. |
| 8,826,371 B2 | 9/2014 | Webb et al. |
| 8,826,393 B2 | 9/2014 | Eisen |
| 8,831,564 B2 | 9/2014 | Ferguson et al. |
| 8,839,394 B2 | 9/2014 | Dennis et al. |
| 8,856,894 B1 | 10/2014 | Dean et al. |
| 8,862,514 B2 | 10/2014 | Eisen |
| 8,868,932 B2 | 10/2014 | Lurey et al. |
| 8,931,058 B2 | 1/2015 | DiChiara et al. |
| 8,938,399 B1 | 1/2015 | Herman |
| 8,954,459 B1 | 2/2015 | McMillan et al. |
| 8,972,400 B1 | 3/2015 | Kapczynski et al. |
| 9,010,627 B1 | 4/2015 | Prasad et al. |
| 9,043,886 B2 * | 5/2015 | Srinivasan ............ H04L 9/3234 726/6 |
| 9,047,473 B2 | 6/2015 | Samuelsson et al. |
| 9,100,400 B2 | 8/2015 | Lunt |
| 9,106,691 B1 | 8/2015 | Burger et al. |
| 9,124,606 B2 | 9/2015 | Metzger |
| 9,147,042 B1 | 9/2015 | Haller et al. |
| 9,154,482 B2 * | 10/2015 | Dudziak ................ H04L 63/08 |
| 9,158,903 B2 | 10/2015 | Metzger |
| 9,185,123 B2 | 11/2015 | Dennis et al. |

(56) References Cited

U.S. PATENT DOCUMENTS

| | | | |
|---|---|---|---|
| 9,195,984 B1 | 11/2015 | Spector et al. | |
| 9,195,985 B2 | 11/2015 | Domenica et al. | |
| 9,196,004 B2 | 11/2015 | Eisen | |
| 9,235,728 B2 | 1/2016 | Gottschalk, Jr. et al. | |
| 9,246,899 B1 | 1/2016 | Durney et al. | |
| 9,256,624 B2 | 2/2016 | Skurtovich, Jr. et al. | |
| 9,269,085 B2 | 2/2016 | Webb et al. | |
| 9,294,476 B1 | 3/2016 | Lurey et al. | |
| 9,361,597 B2 | 6/2016 | Britton et al. | |
| 9,380,057 B2 | 6/2016 | Knauss | |
| 9,390,384 B2 | 7/2016 | Eisen | |
| 9,391,971 B2 | 7/2016 | Lunt | |
| 9,412,141 B2 | 8/2016 | Prichard et al. | |
| 9,420,448 B2 | 8/2016 | Dankar et al. | |
| 9,462,044 B1 * | 10/2016 | Preibisch | H04L 63/0823 |
| 9,465,786 B2 | 10/2016 | Lurey et al. | |
| 9,467,445 B2 | 10/2016 | Egan et al. | |
| 9,491,160 B2 | 11/2016 | Livesay et al. | |
| 9,578,014 B2 * | 2/2017 | Sondhi | H04L 63/0807 |
| 9,600,651 B1 | 3/2017 | Ryan et al. | |
| 9,607,336 B1 | 3/2017 | Dean et al. | |
| 9,626,680 B1 | 4/2017 | Ryan et al. | |
| 9,633,322 B1 | 4/2017 | Burger | |
| 9,641,521 B2 | 5/2017 | Egan et al. | |
| 9,665,854 B1 | 5/2017 | Burger et al. | |
| 9,684,905 B1 | 6/2017 | Haller et al. | |
| 9,697,521 B2 | 7/2017 | Webb et al. | |
| 9,710,523 B2 | 7/2017 | Skurtovich, Jr. et al. | |
| 9,721,147 B1 | 8/2017 | Kapczynski | |
| 9,734,501 B2 | 8/2017 | Durney et al. | |
| 9,754,256 B2 | 9/2017 | Britton et al. | |
| 9,754,311 B2 | 9/2017 | Eisen | |
| 9,779,392 B1 | 10/2017 | Prasad et al. | |
| 9,818,121 B2 | 11/2017 | Snyder et al. | |
| 9,843,582 B2 | 12/2017 | Mahendrakar et al. | |
| 9,876,796 B2 | 1/2018 | Egan et al. | |
| 9,892,389 B2 | 2/2018 | Domenica et al. | |
| 10,075,446 B2 | 9/2018 | McMillan et al. | |
| 10,089,679 B2 | 10/2018 | Eisen | |
| 10,097,551 B2 * | 10/2018 | Chan | H04L 67/2842 |
| 10,169,761 B1 | 1/2019 | Burger | |
| 10,284,548 B2 | 5/2019 | Williams et al. | |
| 10,356,079 B2 | 7/2019 | Lurey et al. | |
| 10,373,240 B1 | 8/2019 | Ross et al. | |
| 10,380,565 B1 | 8/2019 | Prasad | |
| 10,395,053 B2 | 8/2019 | Samid | |
| 10,438,308 B2 | 10/2019 | Prichard et al. | |
| 10,453,159 B2 | 10/2019 | Kapczynski | |
| 10,637,646 B2 | 4/2020 | Krishnamacharya et al. | |
| 10,652,227 B2 * | 5/2020 | Spektor | G06F 21/33 |
| 10,664,936 B2 | 5/2020 | Chapa et al. | |
| 10,685,336 B1 | 6/2020 | Burger et al. | |
| 10,719,873 B1 | 7/2020 | Dean et al. | |
| 10,740,762 B2 | 8/2020 | Burger | |
| 10,798,093 B2 * | 10/2020 | Kaliski, Jr. | H04L 9/3263 |
| 10,798,096 B2 * | 10/2020 | Touati | G06F 21/34 |
| 2001/0029482 A1 | 10/2001 | Tealdi et al. | |
| 2001/0039532 A1 | 11/2001 | Coleman, Jr. et al. | |
| 2001/0042785 A1 | 11/2001 | Walker et al. | |
| 2001/0044729 A1 | 11/2001 | Pomerance | |
| 2001/0044756 A1 | 11/2001 | Watkins et al. | |
| 2001/0049274 A1 | 12/2001 | Degraeve | |
| 2002/0004736 A1 | 1/2002 | Roundtree et al. | |
| 2002/0013827 A1 | 1/2002 | Edstrom et al. | |
| 2002/0013899 A1 | 1/2002 | Faul | |
| 2002/0026519 A1 | 2/2002 | Itabashi et al. | |
| 2002/0032635 A1 | 3/2002 | Harris et al. | |
| 2002/0033846 A1 | 3/2002 | Balasubramanian et al. | |
| 2002/0045154 A1 | 4/2002 | Wood et al. | |
| 2002/0052754 A1 | 5/2002 | Joyce et al. | |
| 2002/0059201 A1 | 5/2002 | Work | |
| 2002/0059521 A1 | 5/2002 | Tasler | |
| 2002/0069122 A1 | 6/2002 | Yun et al. | |
| 2002/0077964 A1 | 6/2002 | Brody et al. | |
| 2002/0087460 A1 | 7/2002 | Hornung | |
| 2002/0091544 A1 | 7/2002 | Middeljans et al. | |
| 2002/0091635 A1 | 7/2002 | Dilip et al. | |
| 2002/0099635 A1 | 7/2002 | Guiragosian | |
| 2002/0103933 A1 | 8/2002 | Garon et al. | |
| 2002/0111816 A1 | 8/2002 | Lortscher et al. | |
| 2002/0116247 A1 | 8/2002 | Tucker et al. | |
| 2002/0120537 A1 | 8/2002 | Morea et al. | |
| 2002/0120757 A1 | 8/2002 | Sutherland et al. | |
| 2002/0120846 A1 | 8/2002 | Stewart et al. | |
| 2002/0128962 A1 | 9/2002 | Kasower | |
| 2002/0133365 A1 | 9/2002 | Grey et al. | |
| 2002/0133462 A1 | 9/2002 | Shteyn | |
| 2002/0138470 A1 | 9/2002 | Zhou | |
| 2002/0143943 A1 | 10/2002 | Lee et al. | |
| 2002/0147801 A1 | 10/2002 | Gullotta et al. | |
| 2002/0157029 A1 | 10/2002 | French et al. | |
| 2002/0169747 A1 | 11/2002 | Chapman et al. | |
| 2002/0173994 A1 | 11/2002 | Ferguson, III | |
| 2002/0174048 A1 | 11/2002 | Dheer et al. | |
| 2002/0184509 A1 | 12/2002 | Scheidt et al. | |
| 2002/0198800 A1 | 12/2002 | Shamrakov | |
| 2002/0198806 A1 | 12/2002 | Blagg et al. | |
| 2002/0198824 A1 | 12/2002 | Cook | |
| 2002/0198830 A1 | 12/2002 | Randell et al. | |
| 2003/0002671 A1 | 1/2003 | Inchalik et al. | |
| 2003/0009418 A1 | 1/2003 | Green et al. | |
| 2003/0009426 A1 | 1/2003 | Ruiz-Sanchez | |
| 2003/0023531 A1 | 1/2003 | Fergusson | |
| 2003/0036995 A1 | 2/2003 | Lazerson | |
| 2003/0046311 A1 | 3/2003 | Baidya et al. | |
| 2003/0046554 A1 | 3/2003 | Leydier et al. | |
| 2003/0048904 A1 | 3/2003 | Wang et al. | |
| 2003/0061163 A1 | 3/2003 | Durfield | |
| 2003/0069839 A1 | 4/2003 | Whittington et al. | |
| 2003/0069943 A1 | 4/2003 | Bahrs et al. | |
| 2003/0097342 A1 | 5/2003 | Whittingtom | |
| 2003/0097380 A1 | 5/2003 | Mulhern et al. | |
| 2003/0105710 A1 | 6/2003 | Barbara et al. | |
| 2003/0105733 A1 | 6/2003 | Boreham | |
| 2003/0105742 A1 | 6/2003 | Boreham et al. | |
| 2003/0115133 A1 | 6/2003 | Bian | |
| 2003/0131102 A1 | 7/2003 | Umbreit | |
| 2003/0154162 A1 | 8/2003 | Danaher et al. | |
| 2003/0158960 A1 | 8/2003 | Engberg | |
| 2003/0163513 A1 | 8/2003 | Schaeck et al. | |
| 2003/0163733 A1 | 8/2003 | Barriga-Caceres et al. | |
| 2003/0171942 A1 | 9/2003 | Gaito | |
| 2003/0177028 A1 | 9/2003 | Cooper et al. | |
| 2003/0182214 A1 | 9/2003 | Taylor | |
| 2003/0187837 A1 | 10/2003 | Culliss | |
| 2003/0188193 A1 * | 10/2003 | Venkataramappa | H04L 63/0807 726/10 |
| 2003/0195859 A1 | 10/2003 | Lawrence | |
| 2003/0200447 A1 | 10/2003 | Sjoblom | |
| 2003/0204429 A1 | 10/2003 | Botscheck et al. | |
| 2003/0204752 A1 | 10/2003 | Garrison | |
| 2003/0208412 A1 | 11/2003 | Hillestad et al. | |
| 2003/0220858 A1 | 11/2003 | Lam et al. | |
| 2004/0002878 A1 | 1/2004 | Hinton | |
| 2004/0006488 A1 | 1/2004 | Fitall et al. | |
| 2004/0010458 A1 | 1/2004 | Friedman | |
| 2004/0010698 A1 | 1/2004 | Rolfe | |
| 2004/0015714 A1 | 1/2004 | Abraham et al. | |
| 2004/0015715 A1 | 1/2004 | Brown | |
| 2004/0019549 A1 | 1/2004 | Gulbrandsen | |
| 2004/0019799 A1 | 1/2004 | Vering et al. | |
| 2004/0024671 A1 | 2/2004 | Freund | |
| 2004/0024709 A1 | 2/2004 | Yu et al. | |
| 2004/0030649 A1 | 2/2004 | Nelson et al. | |
| 2004/0039586 A1 | 2/2004 | Garvey et al. | |
| 2004/0044628 A1 | 3/2004 | Mathew et al. | |
| 2004/0044673 A1 | 3/2004 | Brady et al. | |
| 2004/0044739 A1 | 3/2004 | Ziegler | |
| 2004/0078324 A1 | 4/2004 | Lonnberg et al. | |
| 2004/0083159 A1 | 4/2004 | Crosby et al. | |
| 2004/0088237 A1 | 5/2004 | Moenickheim et al. | |
| 2004/0088255 A1 | 5/2004 | Zielke et al. | |
| 2004/0107250 A1 | 6/2004 | Marciano | |

(56) References Cited

U.S. PATENT DOCUMENTS

| | | |
|---|---|---|
| 2004/0110119 A1 | 6/2004 | Riconda et al. |
| 2004/0111359 A1 | 6/2004 | Hudock |
| 2004/0111375 A1 | 6/2004 | Johnson |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0128150 A1 | 7/2004 | Lundegren |
| 2004/0128156 A1 | 7/2004 | Beringer et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153521 A1 | 8/2004 | Kogo |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0193891 A1 | 9/2004 | Ollila |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225643 A1 | 11/2004 | Alpha et al. |
| 2004/0230527 A1 | 11/2004 | Hansen et al. |
| 2004/0243514 A1 | 12/2004 | Wankmueller |
| 2004/0243518 A1 | 12/2004 | Clifton et al. |
| 2004/0243588 A1 | 12/2004 | Tanner et al. |
| 2004/0243832 A1 | 12/2004 | Wilf et al. |
| 2004/0249811 A1 | 12/2004 | Shostack |
| 2004/0250085 A1 | 12/2004 | Tattan et al. |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0021476 A1 | 1/2005 | Candella et al. |
| 2005/0021551 A1 | 1/2005 | Silva et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0075985 A1 | 4/2005 | Cartmell |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0119978 A1 | 6/2005 | Ates |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0138391 A1 | 6/2005 | Mandalia et al. |
| 2005/0144452 A1* | 6/2005 | Lynch ............... G06F 21/33 |
| | | 713/170 |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0166262 A1 | 7/2005 | Beattie et al. |
| 2005/0171884 A1 | 8/2005 | Arnott |
| 2005/0181765 A1 | 8/2005 | Mark |
| 2005/0208461 A1 | 9/2005 | Krebs et al. |
| 2005/0216434 A1 | 9/2005 | Haveliwala et al. |
| 2005/0216582 A1 | 9/2005 | Toomey et al. |
| 2005/0216953 A1 | 9/2005 | Ellingson |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0256809 A1 | 11/2005 | Sadri |
| 2005/0267840 A1 | 12/2005 | Holm-Blagg et al. |
| 2005/0273431 A1 | 12/2005 | Abel et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010072 A1 | 1/2006 | Eisen |
| 2006/0010391 A1 | 1/2006 | Uemura et al. |
| 2006/0010487 A1 | 1/2006 | Fierer et al. |
| 2006/0016107 A1 | 1/2006 | Davis |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0036870 A1 | 2/2006 | Dasari et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0069635 A1 | 3/2006 | Ram et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085361 A1 | 4/2006 | Hoerle et al. |
| 2006/0101508 A1 | 5/2006 | Taylor |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0140460 A1 | 6/2006 | Coutts |
| 2006/0155573 A1 | 7/2006 | Hartunian |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0195351 A1 | 8/2006 | Bayburtian |
| 2006/0204051 A1 | 9/2006 | Holland, IV |
| 2006/0212407 A1 | 9/2006 | Lyon |
| 2006/0218407 A1 | 9/2006 | Toms |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0282429 A1 | 12/2006 | Hernandez-Sherrington et al. |
| 2006/0282660 A1 | 12/2006 | Varghese et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |

(56) References Cited

U.S. PATENT DOCUMENTS

| | | |
|---|---|---|
| 2007/0043577 A1 | 2/2007 | Kasower |
| 2007/0047714 A1 | 3/2007 | Baniak et al. |
| 2007/0067297 A1 | 3/2007 | Kublickis |
| 2007/0072190 A1 | 3/2007 | Aggarwal |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0112667 A1 | 5/2007 | Rucker |
| 2007/0112668 A1 | 5/2007 | Celano et al. |
| 2007/0121843 A1 | 5/2007 | Atazky et al. |
| 2007/0124256 A1 | 5/2007 | Crooks et al. |
| 2007/0143825 A1 | 6/2007 | Goffin |
| 2007/0156692 A1 | 7/2007 | Rosewarne |
| 2007/0162307 A1 | 7/2007 | Austin et al. |
| 2007/0174186 A1 | 7/2007 | Hokland |
| 2007/0174448 A1 | 7/2007 | Ahuja et al. |
| 2007/0174903 A1 | 7/2007 | Greff |
| 2007/0192121 A1 | 8/2007 | Routson et al. |
| 2007/0192853 A1 | 8/2007 | Shraim et al. |
| 2007/0198432 A1 | 8/2007 | Pitroda et al. |
| 2007/0204338 A1 | 8/2007 | Aiello et al. |
| 2007/0205266 A1 | 9/2007 | Carr et al. |
| 2007/0226122 A1 | 9/2007 | Burrell et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0261108 A1 | 11/2007 | Lee et al. |
| 2007/0261114 A1 | 11/2007 | Pomerantsev |
| 2007/0266439 A1 | 11/2007 | Kraft |
| 2007/0282743 A1 | 12/2007 | Lovelett |
| 2007/0288355 A1 | 12/2007 | Roland et al. |
| 2007/0288360 A1 | 12/2007 | Seeklus |
| 2007/0294195 A1 | 12/2007 | Curry et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0028446 A1 | 1/2008 | Burgoyne |
| 2008/0033742 A1 | 2/2008 | Bernasconi |
| 2008/0033956 A1 | 2/2008 | Saha et al. |
| 2008/0040610 A1 | 2/2008 | Fergusson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059364 A1 | 3/2008 | Tidwell et al. |
| 2008/0066188 A1 | 3/2008 | Kwak |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086431 A1 | 4/2008 | Robinson et al. |
| 2008/0091530 A1 | 4/2008 | Egnatios et al. |
| 2008/0103800 A1 | 5/2008 | Domenikos et al. |
| 2008/0103972 A1 | 5/2008 | Lanc |
| 2008/0104672 A1 | 5/2008 | Lunde et al. |
| 2008/0109422 A1 | 5/2008 | Dedhia |
| 2008/0109875 A1 | 5/2008 | Kraft |
| 2008/0114670 A1 | 5/2008 | Friesen |
| 2008/0115191 A1 | 5/2008 | Kim et al. |
| 2008/0115226 A1 | 5/2008 | Welingkar et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0155686 A1 | 6/2008 | McNair |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201401 A1 | 8/2008 | Pugh et al. |
| 2008/0205655 A1 | 8/2008 | Wilkins et al. |
| 2008/0208726 A1 | 8/2008 | Tsantes et al. |
| 2008/0208735 A1 | 8/2008 | Balet et al. |
| 2008/0208752 A1 | 8/2008 | Gottlieb et al. |
| 2008/0208873 A1 | 8/2008 | Boehmer |
| 2008/0212845 A1 | 9/2008 | Lund |
| 2008/0216156 A1 | 9/2008 | Kosaka |
| 2008/0222706 A1 | 9/2008 | Renaud et al. |
| 2008/0222722 A1 | 9/2008 | Navratil et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0256613 A1 | 10/2008 | Grover |
| 2008/0263058 A1 | 10/2008 | Peden |
| 2008/0270295 A1 | 10/2008 | Lent et al. |
| 2008/0270299 A1 | 10/2008 | Peng |
| 2008/0281737 A1 | 11/2008 | Fajardo |
| 2008/0288283 A1 | 11/2008 | Baldwin, Jr. et al. |
| 2008/0288299 A1 | 11/2008 | Schultz |
| 2008/0301016 A1 | 12/2008 | Durvasula et al. |
| 2008/0306750 A1 | 12/2008 | Wunder et al. |
| 2008/0314977 A1 | 12/2008 | Domenica et al. |
| 2008/0319889 A1 | 12/2008 | Hammad |
| 2009/0006230 A1 | 1/2009 | Lyda et al. |
| 2009/0018986 A1 | 1/2009 | Alcorn et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055322 A1 | 2/2009 | Bykov et al. |
| 2009/0055894 A1 | 2/2009 | Lorsch |
| 2009/0064297 A1 | 3/2009 | Selgas et al. |
| 2009/0094237 A1 | 4/2009 | Churi et al. |
| 2009/0094674 A1 | 4/2009 | Schwartz et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0132347 A1 | 5/2009 | Anderson et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0183259 A1 | 7/2009 | Rinek et al. |
| 2009/0199264 A1 | 8/2009 | Lang |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0215431 A1 | 8/2009 | Koraichi |
| 2009/0216640 A1 | 8/2009 | Masi |
| 2009/0222449 A1 | 9/2009 | Hom et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0254375 A1 | 10/2009 | Martinez et al. |
| 2009/0254476 A1 | 10/2009 | Sharma et al. |
| 2009/0254572 A1 | 10/2009 | Redlich et al. |

(56) References Cited

U.S. PATENT DOCUMENTS

| | | |
|---|---|---|
| 2009/0254656 A1 | 10/2009 | Vignisson et al. |
| 2009/0254971 A1 | 10/2009 | Herz et al. |
| 2009/0260064 A1 | 10/2009 | McDowell et al. |
| 2009/0271847 A1* | 10/2009 | Karjala ............... H04L 63/0807 726/6 |
| 2009/0307778 A1 | 12/2009 | Mardikar |
| 2009/0313134 A1 | 12/2009 | Faith et al. |
| 2009/0313562 A1 | 12/2009 | Appleyard et al. |
| 2009/0319638 A1 | 12/2009 | Faith et al. |
| 2009/0327270 A1 | 12/2009 | Teevan et al. |
| 2009/0328173 A1 | 12/2009 | Jakobson et al. |
| 2010/0011428 A1 | 1/2010 | Atwood et al. |
| 2010/0030578 A1 | 2/2010 | Siddique et al. |
| 2010/0030677 A1 | 2/2010 | Melik-Aslanian et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |
| 2010/0058404 A1 | 3/2010 | Rouse |
| 2010/0063942 A1 | 3/2010 | Arnott et al. |
| 2010/0063993 A1 | 3/2010 | Higgins et al. |
| 2010/0076836 A1 | 3/2010 | Giordano et al. |
| 2010/0077351 A1 | 3/2010 | Kaulgud et al. |
| 2010/0077483 A1 | 3/2010 | Stolfo et al. |
| 2010/0083371 A1 | 4/2010 | Bennetts et al. |
| 2010/0088233 A1 | 4/2010 | Tattan et al. |
| 2010/0094768 A1 | 4/2010 | Miltonberger |
| 2010/0094910 A1 | 4/2010 | Bayliss |
| 2010/0100945 A1 | 4/2010 | Ozzie et al. |
| 2010/0114744 A1 | 5/2010 | Gonen |
| 2010/0114776 A1 | 5/2010 | Weller et al. |
| 2010/0121767 A1 | 5/2010 | Coulter et al. |
| 2010/0122305 A1 | 5/2010 | Moloney |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0138298 A1 | 6/2010 | Fitzherald et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0212004 A1* | 8/2010 | Fu ............................ H04L 63/08 726/9 |
| 2010/0217837 A1 | 8/2010 | Ansari et al. |
| 2010/0217969 A1 | 8/2010 | Tomkow |
| 2010/0223192 A1 | 9/2010 | Levine et al. |
| 2010/0229245 A1 | 9/2010 | Singhal |
| 2010/0241493 A1 | 9/2010 | Onischuk |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250955 A1 | 9/2010 | Trevithick et al. |
| 2010/0257102 A1 | 10/2010 | Perlman |
| 2010/0258623 A1 | 10/2010 | Beemer et al. |
| 2010/0262932 A1 | 10/2010 | Pan |
| 2010/0280914 A1 | 11/2010 | Carlson |
| 2010/0281020 A1 | 11/2010 | Drubner |
| 2010/0293049 A1 | 11/2010 | Maher et al. |
| 2010/0293050 A1 | 11/2010 | Maher et al. |
| 2010/0293058 A1 | 11/2010 | Maher et al. |
| 2010/0293090 A1 | 11/2010 | Domenikos et al. |
| 2010/0299262 A1 | 11/2010 | Handler |
| 2010/0325442 A1 | 12/2010 | Petrone et al. |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0016533 A1 | 1/2011 | Zeigler et al. |
| 2011/0023115 A1 | 1/2011 | Wright |
| 2011/0029388 A1 | 2/2011 | Kendall et al. |
| 2011/0040736 A1 | 2/2011 | Kalaboukis |
| 2011/0071950 A1 | 3/2011 | Ivanovic |
| 2011/0082768 A1 | 4/2011 | Eisen |
| 2011/0083181 A1 | 4/2011 | Nazarov |
| 2011/0113084 A1 | 5/2011 | Ramnani |
| 2011/0119155 A1 | 5/2011 | Hammad et al. |
| 2011/0126024 A1 | 5/2011 | Beatson et al. |
| 2011/0126275 A1 | 5/2011 | Anderson et al. |
| 2011/0131096 A1 | 6/2011 | Frew et al. |
| 2011/0131123 A1 | 6/2011 | Griffin et al. |
| 2011/0137760 A1 | 6/2011 | Rudie et al. |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166988 A1 | 7/2011 | Coulter |
| 2011/0167011 A1 | 7/2011 | Paltenghe et al. |
| 2011/0173681 A1 | 7/2011 | Qureshi et al. |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0196791 A1 | 8/2011 | Dominguez |
| 2011/0208601 A1 | 8/2011 | Ferguson et al. |
| 2011/0211445 A1 | 9/2011 | Chen |
| 2011/0260832 A1 | 10/2011 | Ross et al. |
| 2011/0264566 A1 | 10/2011 | Brown |
| 2011/0270754 A1 | 11/2011 | Kelly et al. |
| 2011/0307397 A1 | 12/2011 | Benmbarek |
| 2011/0307957 A1 | 12/2011 | Barcelo et al. |
| 2012/0011158 A1 | 1/2012 | Avner et al. |
| 2012/0016948 A1 | 1/2012 | Sinha |
| 2012/0018506 A1 | 1/2012 | Hammad et al. |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0047423 A1 | 2/2012 | Tomkow |
| 2012/0054592 A1 | 3/2012 | Jaffe et al. |
| 2012/0072382 A1 | 3/2012 | Pearson et al. |
| 2012/0079585 A1 | 3/2012 | Chan et al. |
| 2012/0084866 A1 | 4/2012 | Stolfo |
| 2012/0089438 A1 | 4/2012 | Tavares et al. |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0130898 A1 | 5/2012 | Snyder et al. |
| 2012/0136763 A1 | 5/2012 | Megdal et al. |
| 2012/0151045 A1 | 6/2012 | Anakata et al. |
| 2012/0173339 A1 | 7/2012 | Flynt et al. |
| 2012/0173563 A1 | 7/2012 | Griffin et al. |
| 2012/0191610 A1 | 7/2012 | Prasad |
| 2012/0215682 A1 | 8/2012 | Lent et al. |
| 2012/0215719 A1 | 8/2012 | Verlander |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack, Jr. et al. |
| 2012/0246730 A1 | 9/2012 | Raad |
| 2012/0253852 A1 | 10/2012 | Pourfallah et al. |
| 2012/0290660 A1 | 11/2012 | Rao et al. |
| 2012/0297484 A1 | 11/2012 | Srivastava |
| 2012/0323717 A1 | 12/2012 | Kirsch |
| 2012/0331557 A1 | 12/2012 | Washington |
| 2013/0004033 A1 | 1/2013 | Trugenberger et al. |
| 2013/0006843 A1 | 1/2013 | Tralvex |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0041701 A1 | 2/2013 | Roth |
| 2013/0066775 A1 | 3/2013 | Milam |
| 2013/0080467 A1 | 3/2013 | Carson et al. |
| 2013/0085804 A1 | 4/2013 | Leff et al. |
| 2013/0085939 A1 | 4/2013 | Colak et al. |
| 2013/0086186 A1 | 4/2013 | Tomkow |
| 2013/0086654 A1 | 4/2013 | Tomkow |

(56) References Cited

U.S. PATENT DOCUMENTS

| | | |
|---|---|---|
| 2013/0110678 A1 | 5/2013 | Vigier et al. |
| 2013/0117087 A1 | 5/2013 | Coppinger |
| 2013/0117387 A1 | 5/2013 | Tomkow |
| 2013/0125010 A1 | 5/2013 | Strandell |
| 2013/0132151 A1 | 5/2013 | Stibel et al. |
| 2013/0139229 A1 | 5/2013 | Fried et al. |
| 2013/0173449 A1 | 7/2013 | Ng et al. |
| 2013/0179955 A1 | 7/2013 | Bekker et al. |
| 2013/0198525 A1 | 8/2013 | Spies et al. |
| 2013/0205135 A1 | 8/2013 | Lutz |
| 2013/0246150 A1 | 9/2013 | Ovick et al. |
| 2013/0246273 A1 | 9/2013 | Ovick et al. |
| 2013/0246528 A1 | 9/2013 | Ogura |
| 2013/0254008 A1 | 9/2013 | Ovick et al. |
| 2013/0254096 A1 | 9/2013 | Serio et al. |
| 2013/0268333 A1 | 10/2013 | Ovick et al. |
| 2013/0271272 A1 | 10/2013 | Dhesi et al. |
| 2013/0275762 A1 | 10/2013 | Tomkow |
| 2013/0279676 A1 | 10/2013 | Baniak et al. |
| 2013/0282461 A1 | 10/2013 | Ovick et al. |
| 2013/0290097 A1 | 10/2013 | Balestrieri et al. |
| 2013/0293363 A1 | 11/2013 | Plymouth |
| 2013/0298238 A1 | 11/2013 | Shah et al. |
| 2013/0332342 A1 | 12/2013 | Kasower |
| 2013/0339217 A1 | 12/2013 | Breslow et al. |
| 2013/0339249 A1 | 12/2013 | Weller et al. |
| 2014/0012733 A1 | 1/2014 | Vidal |
| 2014/0013396 A1* | 1/2014 | Field-Eliot .......... H04L 63/0807 726/4 |
| 2014/0025475 A1 | 1/2014 | Burke |
| 2014/0032723 A1 | 1/2014 | Nema |
| 2014/0033280 A1* | 1/2014 | Nimashakavi ...... H04L 63/0807 726/4 |
| 2014/0040051 A1 | 2/2014 | Ovick et al. |
| 2014/0040135 A1 | 2/2014 | Ovick et al. |
| 2014/0046872 A1 | 2/2014 | Arnott et al. |
| 2014/0051464 A1 | 2/2014 | Ryan et al. |
| 2014/0061302 A1 | 3/2014 | Hammad |
| 2014/0089167 A1 | 3/2014 | Kasower |
| 2014/0110477 A1 | 4/2014 | Hammad |
| 2014/0162611 A1 | 6/2014 | Mezhibovsky et al. |
| 2014/0164112 A1 | 6/2014 | Kala |
| 2014/0164398 A1 | 6/2014 | Smith et al. |
| 2014/0164519 A1 | 6/2014 | Shah |
| 2014/0201100 A1 | 7/2014 | Rellas et al. |
| 2014/0258083 A1 | 9/2014 | Achanta et al. |
| 2014/0279467 A1 | 9/2014 | Chapa et al. |
| 2014/0280945 A1 | 9/2014 | Lunt |
| 2014/0283123 A1 | 9/2014 | Lonstein et al. |
| 2014/0289812 A1 | 9/2014 | Wang et al. |
| 2014/0298485 A1 | 10/2014 | Gardner |
| 2014/0317023 A1 | 10/2014 | Kim |
| 2014/0317716 A1* | 10/2014 | Chao ................ H04L 63/0815 726/9 |
| 2014/0331282 A1 | 11/2014 | Tkachev |
| 2014/0379600 A1 | 12/2014 | Chapa et al. |
| 2015/0067341 A1 | 3/2015 | Deen et al. |
| 2015/0089569 A1* | 3/2015 | Sondhi ................ H04L 63/0807 726/1 |
| 2015/0180870 A1* | 6/2015 | Zhang ................ H04L 63/0807 726/4 |
| 2015/0199667 A1 | 7/2015 | Fernando et al. |
| 2015/0199668 A1 | 7/2015 | Fernando et al. |
| 2015/0249655 A1 | 9/2015 | Lunt |
| 2015/0254658 A1 | 9/2015 | Bondesen et al. |
| 2016/0005020 A1 | 1/2016 | Fernando et al. |
| 2016/0027008 A1 | 1/2016 | John |
| 2016/0050198 A1* | 2/2016 | Thibadeau, Sr. ... H04L 63/0807 726/6 |
| 2016/0065563 A1* | 3/2016 | Broadbent ........ H04L 63/0281 726/9 |
| 2016/0088465 A1 | 3/2016 | Golla |
| 2016/0226879 A1 | 8/2016 | Chan et al. |
| 2016/0275476 A1 | 9/2016 | Artman et al. |
| 2016/0283740 A1* | 9/2016 | Roundtree ............ H04L 63/104 |
| 2016/0337369 A1* | 11/2016 | Sanso .................. H04L 63/102 |
| 2017/0061436 A1 | 3/2017 | Liu et al. |
| 2017/0186012 A1 | 6/2017 | McNeal |
| 2017/0200223 A1 | 7/2017 | Kasower |
| 2017/0324749 A1* | 11/2017 | Bhargava .............. H04L 63/108 |
| 2017/0337343 A1 | 11/2017 | Wong |
| 2017/0337557 A1 | 11/2017 | Durney et al. |
| 2018/0046856 A1 | 2/2018 | Kapczynski |
| 2018/0077142 A1* | 3/2018 | Thakkar .................. H04L 9/088 |
| 2018/0232433 A1 | 8/2018 | Kanvinde |
| 2018/0285549 A1 | 10/2018 | Sonkar et al. |
| 2018/0343265 A1 | 11/2018 | McMillan et al. |
| 2018/0365690 A1 | 12/2018 | Ovick et al. |
| 2018/0375791 A1* | 12/2018 | Kaladgi ................ H04L 67/16 |
| 2019/0228173 A1 | 7/2019 | Gupta et al. |
| 2019/0259030 A1 | 8/2019 | Burger |
| 2020/0104834 A1 | 4/2020 | Pontious et al. |
| 2020/0137080 A1 | 4/2020 | Bloomquist et al. |
| 2020/0160472 A1 | 5/2020 | Kapczynski |
| 2020/0162443 A1 | 5/2020 | Poschel et al. |
| 2020/0304501 A1* | 9/2020 | Fan ...................... G06F 16/957 |
| 2020/0314088 A1* | 10/2020 | Feijoo ...................... G06F 21/41 |

FOREIGN PATENT DOCUMENTS

| | | |
|---|---|---|
| EP | 1 239 378 | 9/2002 |
| EP | 1 301 887 | 4/2003 |
| EP | 1 850 278 | 10/2007 |
| EP | 2 425 583 | 3/2012 |
| EP | 2 074 513 | 2/2016 |
| GB | 2 518 099 | 3/2015 |
| IN | 201917040928 | 11/2019 |
| JP | 2005-135431 | 5/2005 |
| JP | 2005-208945 | 8/2005 |
| JP | 4202314 | 12/2008 |
| JP | 2012-113696 | 6/2012 |
| KR | 10-2000-0063313 | 11/2000 |
| KR | 10-2002-0039203 | 5/2002 |
| KR | 10-2007-0081504 | 8/2007 |
| TW | 256569 | 6/2006 |
| WO | WO 99/054803 | 10/1999 |
| WO | WO 99/060481 | 11/1999 |
| WO | WO 00/030045 | 5/2000 |
| WO | WO 01/009752 | 2/2001 |
| WO | WO 01/009792 | 2/2001 |
| WO | WO 01/010090 | 2/2001 |
| WO | WO 01/084281 | 11/2001 |
| WO | WO 02/011025 | 2/2002 |
| WO | WO 02/029636 | 4/2002 |
| WO | WO 03/073711 | 9/2003 |
| WO | WO 2004/031986 | 4/2004 |
| WO | WO 2004/049654 | 6/2004 |
| WO | WO 2005/033979 | 4/2005 |
| WO | WO 2006/019752 | 2/2006 |
| WO | WO 2006/050278 | 5/2006 |
| WO | WO 2006/069199 | 6/2006 |
| WO | WO 2006/099081 | 9/2006 |
| WO | WO 2007/001394 | 1/2007 |
| WO | WO 2007/050156 | 5/2007 |
| WO | WO 2008/042614 | 4/2008 |
| WO | WO 2008/054849 | 5/2008 |
| WO | WO 2009/064694 | 5/2009 |
| WO | WO 2009/102391 | 8/2009 |
| WO | WO 2009/108901 | 9/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2011/014878 | 2/2011 |
| WO | WO 2012/054646 | 4/2012 |
| WO | WO 2013/126281 | 8/2013 |
| WO | WO 2014/008079 | 1/2014 |
| WO | WO 2014/150987 | 9/2014 |
| WO | WO 2015/038520 | 3/2015 |
| WO | WO 2018/129373 | 7/2018 |
| WO | WO 2018/191638 | 10/2018 |

(56) References Cited

FOREIGN PATENT DOCUMENTS

| WO | WO 2018/199992 | 11/2018 |
|---|---|---|
| WO | WO 2019/006144 | 1/2019 |
| WO | WO 2019/209857 | 10/2019 |
| WO | WO 2019/245998 | 12/2019 |

OTHER PUBLICATIONS

Jones et al.; JSON Web Signature (JWS); 2015; Retrieved from the Internet https://tools.ietf.org/html/rfc7515; pp. 1-59, as printed. (Year: 2015).*

Franks et al.; HTTP Authentication: Basic and Digest Access Authentication; 1999; Retrieved from the Internet https://tools.ietf.org/pdf/rfc2617.pdf; pp. 1-34, as printed. (Year: 1999).*

Lodderstedt et al.; OAuth 2.0 Token Revocation; 2013; Retrieved from the Internet https://tools.ietf.org/html/rfc7009; pp. 1-11, as printed. (Year: 2013).*

EatonZ; OAuth id_token missing information on refresh; 2018; Retrieved from the Internet https://github.com/googleapis/google-api-dotnet-client/issues/1141; pp. 1-9, as printed. (Year: 2018).*

U.S. Appl. No. 12/705,489, filed Feb. 12, 2010, Bargoli et al.

U.S. Appl. No. 12/705,511, filed Feb. 12, 2010, Bargoli et al.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aharony et al., "Social Area Networks: Data Networking of the People, by the People, for the People," 2009 International Conference on Computational Science and Engineering, May 2009, pp. 1148-1155.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.

ABC News Now:Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, p. 5.

Anonymous, "MBNA Offers Resolution of Credit Card Disputes," Hempstead, Feb. 2002, vol. 68, No. 2, p. 47.

Anonymous, "Feedback", Credit Management, ABI/INFORM Global, Sep. 2006, pp. 6.

Bielski, Lauren, "Will you Spend to Thwart ID Theft?" ABA Banking Journal, Apr. 2005, pp. 54, 56-57, 60.

BlueCava, "What We Do", http://www.bluecava.com/what-we-do/, printed Nov. 5, 2012 in 3 pages.

Buxfer, http://www.buxfer.com/ printed Feb. 5, 2014 in 1 page.

Check, http://check.me/ printed Feb. 5, 2014 in 3 pages.

Chores & Allowances, "Do Kids Have Credit Reports?" Oct. 15, 2007, http://choresandallowances.blogspot.com/2007/10/do-kids-have-credit-reports.html, pp. 5.

Comlounge.net, "plonesocial.auth.rpx" http://web.archive.org/web/20101026041841/http://comlounge.net/rpx as captured Oct. 26, 2010 in 9 pages.

"Consumers Gain Immediate and Full Access to Credit Score Used by Majority of U.S. Lenders", PR Newswire, ProQuest Copy, Mar. 19, 2001, p. 1.

"CreditCheck Monitoring Services," Dec. 11, 2000, pp. 1, lines 21-23.

Cullen, Terri; "The Wall Street Journal Complete Identity Theft Guidebook:How to Protect Yourself from the Most Pervasive Crime in America"; Chapter 3, pp. 59-79; Jul. 10, 2007.

"D&B Corporate Family Linkage", D&B Internet Access for U.S. Contract Customers, https://www.dnb.com/ecomp/help/linkage.htm as printed Dec. 17, 2009, pp. 1.

Day, Jo and Kevin; "ID-ology: A Planner's Guide to Identity Theft"; Journal of Financial Planning:Tech Talk; pp. 36-38; Sep. 2004.

Equifax; "Equifax Credit Watch"; https://www.econsumer.equifax.co.uk/consumer/uk/sitepage.ehtml, dated Jun. 27, 2007 on www.archive.org.

Ettorre, "Paul Kahn on Exceptional Marketing," Management Review, vol. 83, No. 11, Nov. 1994, pp. 48-51.

Facebook, "Facebook helps you connect and share with the people in your life," www.facebook.com printed Nov. 16, 2010 in 1 page.

FamilySecure.com, "Frequently Asked Questions", http://www.familysecure.com/FAQ.aspx as archived Jul. 15, 2007 in 3 pages.

FamilySecure.com; "Identity Theft Protection for the Whole Family | FamilySecure.com" http://www.familysecure.com/, as retrieved on Nov. 5, 2009.

Fenner, Peter, "Mobile Address Management and Billing for Personal Communications", 1st International Conference on Universal Personal Communications, 1992, ICUPC '92 Proceedings, pp. 253-257.

"Fictitious Business Name Records", Westlaw Database Directory, http://directory.westlaw.com/scope/default.asp?db=FBN-ALL&RS-W...&VR=2.0 as printed Dec. 17, 2009, pp. 5.

Fisher, Joseph, "Access to Fair Credit Reports: Current Practices and Proposed Legislation," American Business Law Journal, Fall 1981, vol. 19, No. 3, p. 319.

"Fraud Alert | Learn How". Fight Identity Theft. http://www.fightidentitytheft.com/flag.html, accessed on Nov. 5, 2009.

Gibbs, Adrienne; "Protecting Your Children from Identity Theft," Nov. 25, 2008, http://www.creditcards.com/credit-card-news/identity-ID-theft-and-kids-children-1282.php, pp. 4.

Gordon et al., "Identity Fraud: A Critical National and Global Threat," LexisNexis, Oct. 28, 2003, pp. 1-48.

Harrington et al., "iOS 4 In Action", Chapter 17, Local and Push Notification Services, Manning Publications Co., Jun. 2011, pp. 347-353.

Herzberg, Amir, "Payments and Banking with Mobile Personal Devices," Communications of the ACM, May 2003, vol. 46, No. 5, pp. 53-58.

Hoofnagle, Chris Jay, "Identity Theft: Making the Known Unknowns Known," Harvard Journal of Law & Technology, Fall 2007, vol. 21, No. 1, pp. 98-122.

ID Analytics, "ID Analytics® Consumer Notification Service" printed Apr. 16, 2013 in 2 pages.

ID Theft Assist, "Do You Know Where Your Child's Credit Is?", Nov. 26, 2007, http://www.idtheftassist.com/pages/story14, pp. 3.

"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.

Identity Theft Resource Center; Fact Sheet 120 A—To Order a Credit Report for a Child; Fact Sheets, Victim Resources; Apr. 30, 2007.

"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.

Ideon, Credit-Card Registry that Bellyflopped this Year, Is Drawing some Bottom-Fishers, The Wall Street Journal, Aug. 21, 1995, pp. C2.

Information Brokers of America, "Information Brokers of America Child Identity Theft Protection" http://web.archive.org/web/20080706135451/http://iboainfo.com/child-order.html as archived Jul. 6, 2008 in 1 page.

Information Brokers of America, "Safeguard Your Child's Credit", http://web.archive.org/web/20071215210406/http://www.iboainfo.com/child-id-protect.html as archived Dec. 15, 2007 in 1 page.

(56) References Cited

OTHER PUBLICATIONS

Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, 2007.
Lobo, Jude, "MySAP.com Enterprise Portal Cookbook," SAP Technical Delivery, Feb. 2002, vol. 1, pp. 1-13.
Magid, Lawrence, J., Business Tools: When Selecting an ASP Ensure Data Mobility, Los Angeles Times, Los Angeles, CA, Feb. 26, 2001, vol. C, Issue 4, pp. 3.
Manilla, http://www.manilla.com/how-it-works/ printed Feb. 5, 2014 in 1 page.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/how-it-works/ printed Feb. 5, 2013 in 2 pages.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
"Name Availability Records", Westlaw Database Directory, http://directory.westlaw.com/scope/default.asp?db=NA-ALL&RS=W...&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.

(56) References Cited

OTHER PUBLICATIONS

Scholastic Inc.:Privacy Policy http://web.archive.org/web/20070127214753/http://www.scholastic.com/privacy.htm as archived Jan. 27, 2007 in 3 pages.
Securities and Futures Commission, "Guideline on Anti-Money Laundering and Counter-Terrorist Financing", Jul. 2012, pp. 135.
Singletary, Michelle, "The Littlest Victims of ID Theft", The Washington Post, The Color of Money, Oct. 4, 2007.
Sun, Hung-Min "An Efficient Remote Use Authentication Scheme Using Smart Cards", IEEE Transactions on Consumer Electronics, Nov. 2000, vol. 46, No. 4, pp. 958-961.
Target, "Free Credit Monitoring and Identity Theft Protection with Experian's ProtectMyID Now Available", Jan. 13, 2014, pp. 2. http://corporate.target.com.
TheMorningCall.Com, "Cheap Ways to Foil Identity Theft," www.mcall.com/business/columnists/all-karp.5920748jul01,0 . . . , published Jul. 1, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wang et al., "User Identification Based on Finger-vein Patterns for Consumer Electronics Devices", IEEE Transactions on Consumer Electronics, May 2010, vol. 56, No. 2, pp. 799-804.
WhatIs.com, "Risk-Based Authentication (RBA)", https://web.archive.org/web/20121025033106/http://whatis.techtarget.com/definition/risk-based-authentication-RBA, Oct. 23, 2012, pp. 1.
Yahoo! Search, "People Search," http://people.yahoo/com printed Nov. 16, 2010 in 1 page.
YODLEE | Money Center, https://yodleemoneycenter.com/ printed Feb. 5, 2014 in 2 pages.
You Need a Budget, http://www.youneedabudget.com/features printed Feb. 5, 2014 in 3 pages.
Extended European Search Report for Application No. EP14843372.5, dated May 2, 2017.
International Search Report and Written Opinion for Application No. PCT/US2014/054713, dated Dec. 15, 2014.
International Preliminary Report on Patentability in Application No. PCT/US2014/054713, dated Mar. 24, 2016.
Official Communication in Australian Patent Application No. 2006306790, dated Apr. 29, 2010.
Official Communication in Australian Patent Application No. 2006306790, dated May 19, 2011.
International Search Report and Written Opinion for Application No. PCT/US2006/028006, dated Jul. 27, 2007.
International Preliminary Report on Patentability in Application No. PCT/US2006/028006, dated Apr. 23, 2008.
Cheng, Fred, "Security Attack Safe Mobile and Cloud-based One-time Password Tokens Using Rubbing Encryption Algorithm", MONET, 2011, vol. 16, pp. 304-336.
Gordon et al., "Using Identity Authentication and Eligibility Assessment to Mitigate the Risk of Improper Payments", LexisNexis, Jan. 28, 2008, pp. 18. https://risk.lexisnexis.com/-/media/files/government/white-paper/identy_authentication-pdf.pdf.
International Search Report and Written Opinion for Application No. PCT/US2019/037547, dated Oct. 4, 2019.
Official Communication in Australian Patent Application No. 2014318966, dated Apr. 6, 2019.
Official Communication in European Application No. EP14843372.5, dated Nov. 29, 2018.
Equifax, "InstaTouch ID: Separate Fact from Friction." http://equifax.uberflip.com/i/791148-mobile-consumer-identity-service-product-sheet/1, 2016, pp. 2.
Extended European Search Report for Application No. EP19203040.1, dated Jan. 29, 2020.
Official Communication in Canadian Patent Application No. 2,923,697, dated Oct. 9, 2019.

\* cited by examiner

TOKEN GENERATION

EXAMPLE TOKEN DATA STRUCTURES

Thin JSON Web Token

| alg | kid | typ | Sub | Email | First Name | Iss | Last Name | Exp | Iat | UUID |
|---|---|---|---|---|---|---|---|---|---|---|

Header: alg, kid, typ
Payload: Sub, Email, First Name, Iss, Last Name, Exp, Iat, UUID

FIG. 6A

Fat JSON Web Token

| alg | kid | typ | Sub | Email | First Name | Iss | Last Name | Exp | Iat | User Product | User Product Options | User Extra Info | ... |
|---|---|---|---|---|---|---|---|---|---|---|---|---|---|

Header: alg, kid, typ
Payload: Sub, Email, First Name, Iss, Last Name, Exp, Iat, User Product, User Product Options, User Extra Info, ...

FIG. 6B

EXAMPLE TOKEN HEADERS

Token Requesting Access to Protected Resource

| Client_id | Client_secret | Content_type |
|---|---|---|

Header FIG. 7A

Refresh Token Request

| Client_id | Client_secret | Content_type | Grant_type | Refresh_token |
|---|---|---|---|---|

Header FIG. 7B

Revoke Token

| Client_id | Client_secret | Token | Token_type |
|---|---|---|---|

Header FIG. 7C

Product Token

| User Product | Security and Access Provider ID |
|---|---|

Header FIG. 7D

SYSTEM AND METHOD FOR A TOKEN GATEWAY ENVIRONMENT

CROSS-REFERENCE TO RELATED APPLICATIONS

This application claims priority to U.S. Provisional Patent Application No. 62/688,887 filed on Jun. 22, 2018 and titled "SYSTEM AND METHOD FOR A TOKEN GATEWAY ENVIRONMENT." The entire content of the above referenced application is hereby expressly incorporated herein by reference in its entirety.

BACKGROUND

The disclosure relates to a token gateway environment for providing more efficient and more secure authorization to parties accessing protected resources.

SUMMARY OF THE DISCLOSURE

Various systems, methods, and devices are disclosed for providing a token gateway environment for providing authorization to parties accessing protected resources. The systems, methods, and devices of the disclosure each have several innovative aspects, no single one of which is solely responsible for the desirable attributes disclosed herein.

In one embodiment, a system for providing tokens to facilitate authentication and access to protected resources is disclosed. The system includes: a token gateway computing system in electronic communication with a third party user computing system; at least one security and access management computing system; a token management computing system; and a protected resource computing system, wherein the token gateway computing system is configured to: receive, from the third party user computing system, an encrypted data packet including user credentials of a third party user and a request for an authentication token to access one or more protected resources from the protected resource computing system; decrypt and parse the received encrypted data packet to extract the third party user's security information and to determine a type associated with each of the one or more protected resources requested; transmit an encrypted data packet to the at least one security and access management computing system based on the determined type, wherein the encrypted data packet includes the third party user's security information and a request for user validation; receive, from the at least one security and access management computing system, validation of the third party user, and private data; generate a thin token; generate a fat token using the private data; store the thin token in association with the fat token in the token management computing system; transmit the thin token to the third party user computing system; receive, from the third party user computing system, a request to access one or more protected resources from the protected resource computing system, the request comprising the thin token; validate the received thin token; access the fat token associated with the thin token in the token management computing system; and transmit the fat token to the protected resource computing system.

In another embodiment, a computer-implemented method for providing tokens to facilitate authentication and access to protected resources is disclosed. The computer-implemented method comprising, as implemented by one or more computing devices within a token gateway system configured with specific executable instructions receiving, from a third party user computing system, an encrypted data packet including user credentials of a third party user and a request for an authentication token to access one or more protected resources from a protected resource computing system; decrypting and parsing the received encrypted data packet to extract the third party user's security information and to determine a type associated with each of the one or more protected resources requested; transmitting an encrypted data packet to at least one security and access management computing system based on the determined type, wherein the encrypted data packet includes the third party user's security information and a request for user validation; receiving, from the at least one security and access management computing system, validation of the third party user, and private data; generating a thin token; generating a fat token using the private data; storing the thin token in association with the fat token in the token management computing system; transmitting the thin token to the third party user computing system; receiving, from the third party user computing system, a request to access one or more protected resources from the protected resource computing system, the request comprising the thin token; validating the received thin token; accessing the fat token associated with the thin token in a token management computing system; and transmitting the fat token to the protected resource computing system.

In a further embodiment, a non-transitory computer storage medium storing computer-executable instructions is disclosed. The computer-executable instructions, when executed by a processor, can cause the processor to at least: receive, from a third party user computing system, an encrypted data packet including user credentials of a third party user and a request for an authentication token to access one or more protected resources from a protected resource computing system; decrypt and parse the received encrypted data packet to extract the third party user's security information and to determine a type associated with each of the one or more protected resources requested; transmit an encrypted data packet to at least one security and access management computing system based on the determined type, wherein the encrypted data packet includes the third party user's security information and a request for user validation; receive, from the at least one security and access management computing system, validation of the third party user, and private data; generate a thin token; generate a fat token using the private data; store the thin token in association with the fat token in the token management computing system; transmit the thin token to the third party user computing system; receive, from the third party user computing system, a request to access one or more protected resources from the protected resource computing system, the request comprising the thin token; validate the received thin token; access the fat token associated with the thin token in a token management computing system; and transmit the fat token to the protected resource computing system.

BRIEF DESCRIPTION OF DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

Throughout the drawings, reference numbers are re-used to indicate correspondence between referenced elements. The drawings are provided to illustrate embodiments of the subject matter described herein and not to limit the scope thereof. Specific embodiments will be described with reference to the following drawings.

FIGS. 6A and 6B are block diagrams illustrating embodiments of token data structures.

FIGS. 7A, 7B, 7C and 7D are block diagrams illustrating embodiments of token headers.

DESCRIPTION OF VARIOUS EMBODIMENTS

Figure 1:
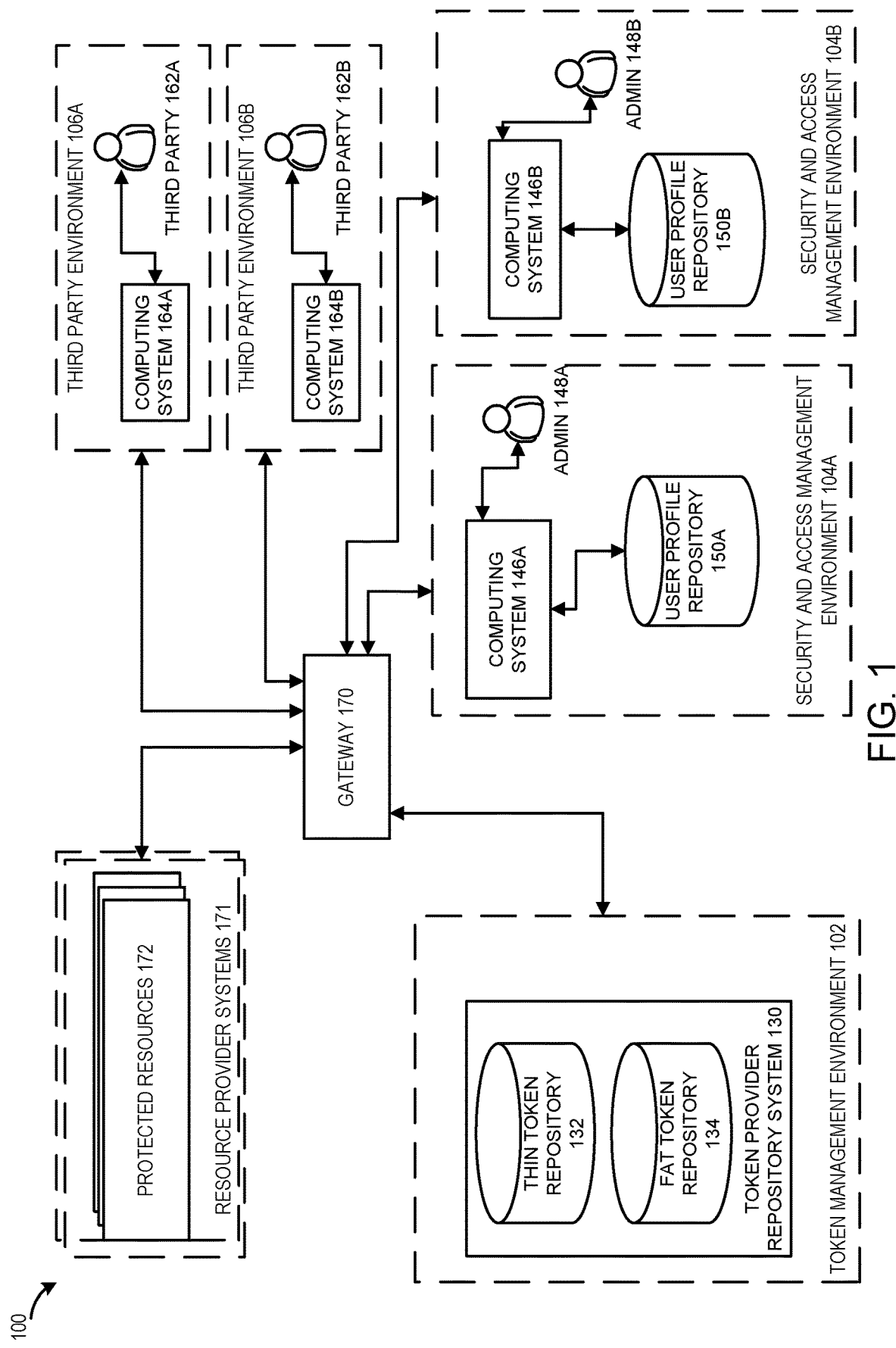
FIG. 1 is an overall system diagram depicting one embodiment of a token gateway environment.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

I. Overview

Features are described for embodiments of a token gateway environment. The token gateway environment helps to provide more efficient and/or more secure authorization to third parties accessing protected resources. In some embodiments, the environment enables trusted users of third parties to obtain limited access to protected resources such as, for example, secure data files. A requesting user of a third party may request a token to use for later accessing a protected resource. The requesting user sends an electronic request to the token gateway environment with his/her credentials, and then the token gateway environment validates the credentials with a security and access management environment using a standard open protocol such as OAuth 2.0. OAuth 2.0 is an authorization framework that enables applications to obtain limited access to user accounts. It works by delegating user authentication to the service that hosts the user account, and authorizing third-party applications to access the user account. OAuth 2.0 provides authorization flows for web, desktop applications and mobile devices.

If the requesting user's credentials are validated, two levels of tokens are generated by the token gateway environment. A first level token, referred to herein as a thin token, and a second level token, referred to herein as a fat token, are both generated. The thin token includes a minimal or smaller set of information associated with the requesting user that is used in secure authorization flows such as OAuth 2.0 to validate the access token or to provide information to decide whether to grant the requesting user access to the protected resource. The fat token includes additional details associated with the requesting user which may be internal and specific to the protected resources which may include information that cannot be shared with the third party for security or confidentiality reasons. Thus, the thin token is provided to the third party application, but the information in the fat token is not made available to the third party application.

When the requesting user then attempts to access the protected resources, the token gateway validates the user using the previously issued thin token and sends a token to the resource provider system to indicate that the user has been authenticated. However, rather than sending the standard thin token, the token gateway instead sends the corresponding fat token which includes the user's authentication information but also includes the internal and specific information retrieved from the security and access management system which may be too sensitive to have sent in any token directly to the third party user system. The standard secure authorization flow is not interrupted as a token is still sent to the resource provider system, but the thin token has been replaced with a more robust and data rich fat token.

II. System

The environment may include a gateway system in communication with one or more third party environments requesting authorization to access one or more protected resources, where such resources may include, for example, resources including applications and reports on various backend servers or mainframe systems. The gateway system may also be in communication with one or more security and access management environments. The security and access management environments may include user profile repositories. The gateway system may also be in communication with a token management environment, including a token provider repository system. The token provider repository system may include various repositories for storing the different tokens of the token gateway system.

FIG. 1 is an overall system diagram depicting one embodiment of a token gateway environment 100 for providing more efficient and/or more secure authorization to parties accessing protected resources. The environment 100 shown in FIG. 1 includes third party environments 106A and 106B, gateway 170, security and access management environments 104A and 104B, token management environment 102, and resource provider systems 171 storing protected resources 172. In one embodiment, the systems may communicate via one or more networks, which may include one or more of a local area network, a wide area network, the Internet, or a cloud-computing network, implemented via a wired, wireless, or combination of wired and wireless communication links.

A. Example Third Party Environments

The token gateway environment 100 shown in FIG. 1 includes third party environments 106A and 106B. The third party environments 106A and 106B respectively include users associated with third parties 162A and 162B, as well as the associated one or more computing systems 164A and 164B. The one or more computing systems may include computer devices whether they be a personal computer, server computer, laptop computer, or tablet; personal digital assistants (PDAs) such as a Palm-based device or Windows CE device; smart phones such as cellular phones; a wireless device such as a wireless email device or other device capable of communicating wireless with a computer network; or any other type of network device that may communicate over a network and process electronic transactions. While only two such computing systems are shown in FIG. 1, it is recognized that there could be several other computing systems in various embodiments.

Some examples of third parties include organizations that have requested products or services from one or more of the resource provider systems 171. The third party may be any entity using a computing system to request resources. For example third parties may include financial institutions, mortgage lenders, landlords, and the like, wishing to access protected credit information associated with one or more of consumers, borrowers, potential tenants, and the like. As another example, the third party organization may include medical providers, insurance companies, pharmacies, and the like, wishing to access protected health record data associated with patients. It is recognized that the token gateway environment 100 may provide validation of users to be able access a variety of protected resources.

The connection between a computing system and an online organization may be, for example, a connection between a client computer and a website server over a network. One or more servers may communicate with one or more client computers across a network. The network, for example, can include a private network, such as a LAN, or interconnections to the online organizations over a communications network, such as the Internet or World Wide Web or any other network that is capable of communicating digital data, such as a wireless or cellular network. Each computing system may connect to any online organization over the network using data protocols, such as HTTP, HTTPS and the like.

In one embodiment, the respective computing systems 164A and 164B communicate with the gateway 170 over a network to request authorization on behalf of the third parties 162A and 162B to access one or more of protected resources 172 on resource provider systems 171.

B. Gateway

The token gateway environment 100 shown in FIG. 1 includes a gateway 170. The gateway 170 communicates with each of the third party environments 106A and 106B, security and access management environments 104A and 104B, token management environment 102, and the resource provider systems 171.

In some embodiments, the gateway 170 manages communications to enable third party applications 106A, 106B and the like to provide information to resource provider systems 171 to obtain limited access to protected resources 172. The illustrated gateway 170 communicates with security and access management platforms 104A, 104B and the like, facilitates a first level of authentication of the requesting users at third parties by generating a first token, and also generates a second token including additional information to provide information that can be used by the resource provider systems 171 to determine access to the protected resources 172.

Figure 8:
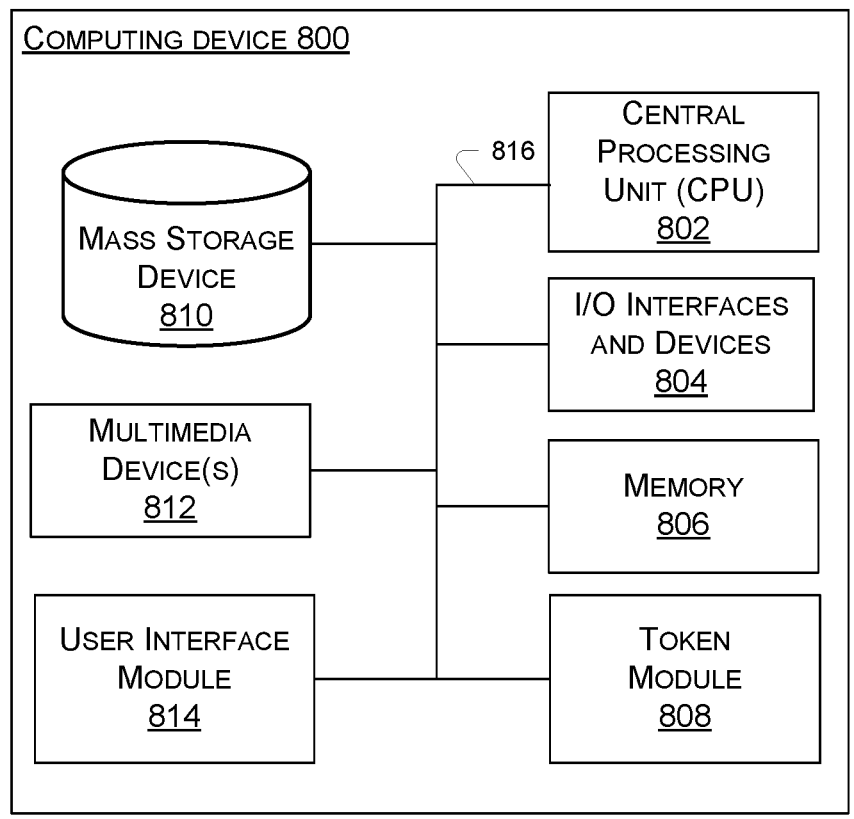
FIG. 8 is a general system diagram illustrating an embodiment of a computing system.

An example embodiment of a computing system for the gateway 170 is illustrated in FIG. 8, and described further below.

By providing the token generation, the gateway 170 acts as the perimeter security for the protected resources 172, authenticating the third party users through the appropriate systems, and allowing only authenticated third party users to move to the next level of potentially accessing the protected resources. Additionally, by separating the authentication and access tokens, proprietary information about the protected resources is not provided to any of the third parties.

C. Example Security and Access Management Environments

The token gateway environment 100 shown in FIG. 1 includes security and access management environments 104A and 104B. The security and access management environments 104A and 104B respectively include administrators 148A and 148B, with associated computing systems 146A and 146B. The security and access management environments 104A and 104B also respectively include user profile repositories 150A and 150B. While only two such environments are shown in FIG. 1, it is recognized that there could be several others in various embodiments.

Some example security and access management environments 104A and 104B include identity and access management platforms such as for example Okta, Centify, Microsoft Azure, RSA SecurID, OneLogin, LDAP, and the like.

Each of the illustrated security and access management environments also include repositories a user profile repository 132 or 134. The user profile repository includes a data store configured to store information regarding user information and associated permissions for users associated with third parties and which can be used for accessing various protected resources. The third parties may be organizations or groups, and users may be associated with such organizations and groups. The user profile repository may also include additional information about the user such as, for example, which products he/she may have access to, what levels of access, or about the systems providing the products, such as, for example, secure IP information, security information, and the like.

While one database is included in each of the security and access management environments of the embodiment of FIG. 1, it is recognized that one or more of the databases may be combined, divided, and/or deleted. In addition, subsets of data from one database may be stored in another database as a duplicate copy or as the sole copy. Further, portions or all of one or more of the databases may be stored in a cloud, remote from the security and access management environments 104A or 104B, and/or stored in a distributed system.

When a user at a third party 162A or 162B requests authentication and access to a protected resource 172 from the gateway 170, the gateway 170 communicates with the appropriate one or more of the security and access management environments 104A, 104B, depending on the service that hosts the appropriate account for the third party user and the type of protected resource requested, to delegate the user authentication to the appropriate platform. The appropriate security and access management environments 104A, 104B then utilize the respective user profile repositories 150A, 150B to authenticate the third party requesting user.

D. Token Management Environment

The token gateway environment 100 shown in FIG. 1 includes a token management environment 102. The token management environment 102 includes a token provider repository system 130, which includes one or more of thin token repository 132 and fat token repository 134. Although there are two repositories illustrated in FIG. 1, in various embodiments, the thin token repository 132 and fat token repository 134 may be the same repository, such as a single cache.

Each of the token repositories 132 and 134 includes a data store configured to store a local copy of the tokens. In one embodiment, the thin and fat tokens may be stored in a key-value cache scheme, where the thin token may represent the key, and the fat token may represent the associated value, and only the key is provided to the third party user after authentication, by providing the thin token. In some embodiments, the thin token may be associated with two or more fat tokens.

While two separate databases are included in the embodiment of FIG. 1, it is recognized that one or more of the databases may be combined, divided, and/or deleted. In addition, subsets of data from one database may be stored in another database as a duplicate copy or as the sole copy. Further, portions or all of one or more of the databases may be stored in a cloud, stored remote from the gateway 170, and/or stored in a distributed system. The The token management environment may have modules for generating tokens, revoking access, deleting and/or flushing tokens, and so forth.

E. Resource Provider Systems

The token gateway environment 100 shown in FIG. 1 includes resource provider systems 171 controlling protected resources 172. Some example resource provider systems 171 include for example back-end servers and/or mainframe systems of various data provider entities, such as for example, providers of credit data or credit reports, or repositories for storing health data.

III. Example Information Flow

Figure 2:
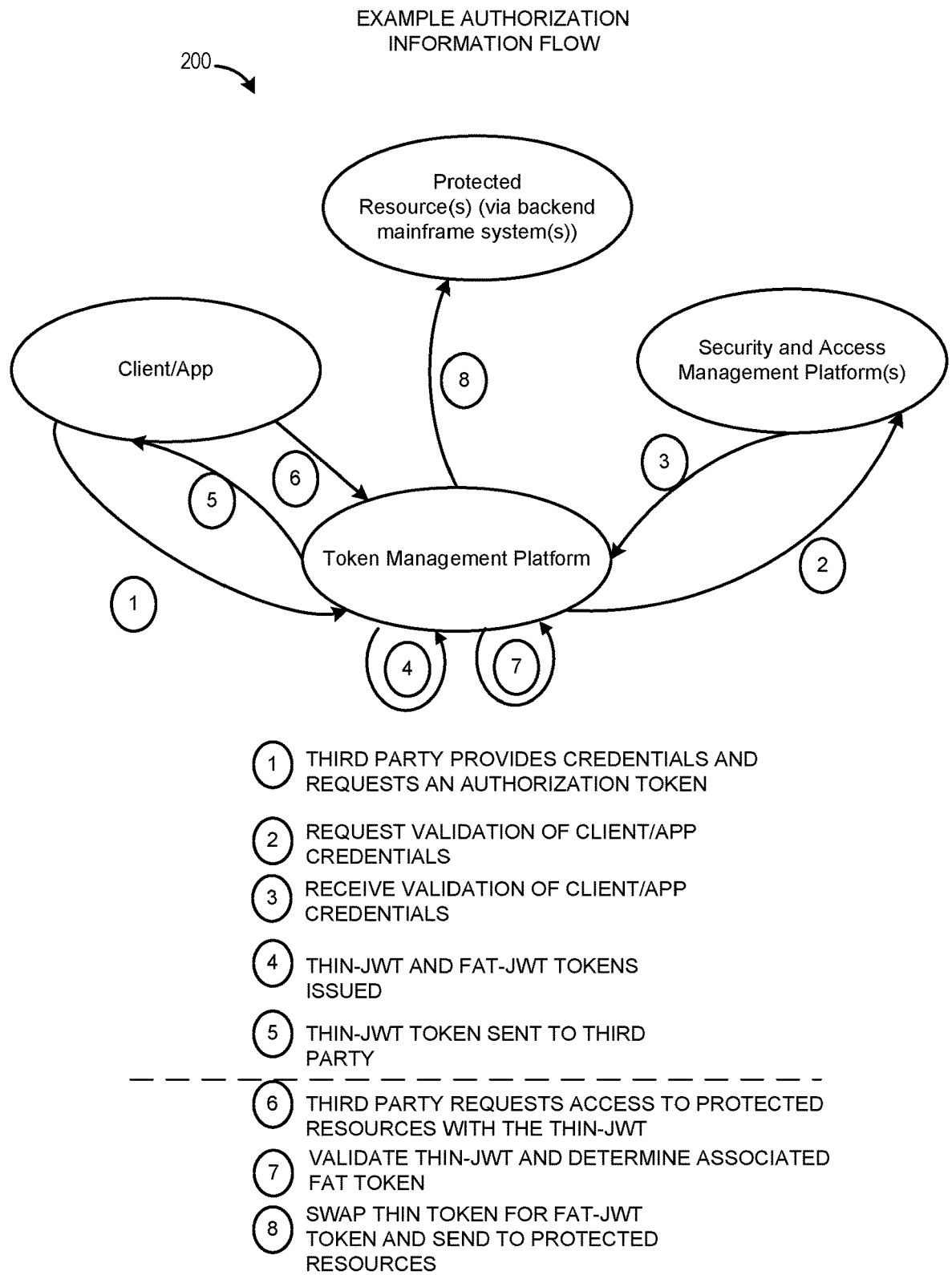
FIG. 2 is a block diagram illustrating an embodiment of information flow within the token gateway environment.

As described with reference to FIG. 1, the token gateway environment 100 can receive a request from a third party computing system 164A or 164B, and generate a thin token and a fat token to facilitate authentication of the requesting user from a third party to access one or more of the protected resources 172 on resource provider systems 171. FIG. 2 illustrates an example embodiment of information flow within the token gateway environment. The example data flow diagram 200 can involve one or more third party environments 106A or 106B, a gateway 170, a token management environment 102, and one or more security access management environments 104A or 104B.

At (1), a requesting user from a third party provides credentials and requests an authorization token to be used to access one or more protected resources. One or more third party computing systems can send a request to the gateway to obtain a token to get validation to access one or more of the protected resources. The request can include the requesting user's security information such as, for example, one or more of the user's username and password on one or more security and access management environments, the user's email addresses (for example, "username1@email.com" and "username2@anotheremail.com"), zip codes associated with the user's addresses (for example, the user's address in the past 2 years), the user's phone numbers (for example, the user's work phone and home phone numbers), and the like. The request may be in an XML format, although other formats such as, for example, txt or HTML are also possible. The gateway 170 can parse the request to extract the user's security information.

At (2), the gateway can communicate the request to one or more security and access management environment(s) for authenticating the requesting user based on the user's security information, and based on the type of protected resources for which access is requested. The appropriate security and access management environment(s) then verify the third party user's credentials. If the credentials are validated, validation is confirmed with the gateway, and the flow moves to (3). However, if the credentials are not validated, then the flow is interrupted.

If the credentials are validated by one or more of the security and access management platform(s), then, at (3), the gateway receives the validation.

At (4), the gateway then generates two tokens—a thin token and a fat token and stores them in a memory, such as for example a cache. The structure of both tokens may be based on JavaScript Object Notation ("JSON") Web Token ("JWT") and OAuth 2.0 authorization standards, but it is recognized that other structures and standards may be used.

JSON is a text format that is completely language independent but uses conventions that are similar to the C-family of languages, including C, C++, C#, Java, JavaScript, Perl, Python, and many others. JSON is built on two structures: (1) a collection of name/value pairs. In various languages, this is realized as an object, record, struct, dictionary, hash table, keyed list, or associative array, and (2) an ordered list of values. It makes sense that a data format that is interchangeable with programming languages also be based on these structures. In JSON: An object is an unordered set of name/value pairs and begins with {(left brace) and ends with} (right brace). Each name is followed by : (colon) and the name/value pairs are separated by, (comma). A value can be a string in double quotes, or a number, or true or false or null, or an object or an array. These structures can be nested. A string is a sequence of zero or more Unicode characters, wrapped in double quotes, using backslash escapes. A character is represented as a single character string. A number is very much like a C or Java number, except that the octal and hexadecimal formats are not used. Whitespace can be inserted between any pair of tokens.

OAuth 2.0 is an open protocol to allow secure authorization in a simple and standard method from web, mobile and desktop applications.

Both of the tokens may be encrypted. The thin token may be used as a key to the cache, whereas the fat token may be regarded as the data structure in the cache. In some embodiments, the thin token may be associated with one or more fat tokens. In some embodiments, the information stored in the thin token may include the minimal or smaller set of information required by the third party to validate the user's access to one or more of the protected resources. The fat token may store details internal to the protected resources, including, for example, user information, IP restriction, time of day values, product information, mainframe details, and the like. In some embodiments, a fat token may include one or more separate payloads for details obtained from one or more security and access management platforms. In other embodiments, a separate fat token may be created for capturing the details obtained from each of the security and access management platforms.

At (5), the gateway provides the thin token to the third party requester. This thin token may act as the equivalent of validation of the requested to then access one or more of the protected resources.

At (6), with a valid thin token, the requesting user at the third party can make a request to access one or more of the protected resources. The request may immediately follow the authorization request, or it may be some time after the authorization request. The access request is received by the gateway.

At (7), the gateway validates the thin token received, and, based on the validated thin token, accesses the associated fat token. As described above, the thin token may be regarded as the key which points to the appropriate location in the cache where the associated fat token is stored. The gateway may then retrieve the fat token for the requesting user and the protected resource requested.

At (8), the gateway swaps the thin token received from the third party for the fat token retrieved from the repository, and sends the fat token to the requested resource provider system 171 to confirm that the requesting user is authenticated such as via an API call. This way, the third party never receives additional information regarding the protected resources which may include details on specific IP address or mainframe details used by the resource provider system, or other sensitive or confidential information. Also, the resource provider system 171 does not need to communicate with the security and access management platforms again following initial authentication.

IV. Gateway Environment Processes

Figure 3:
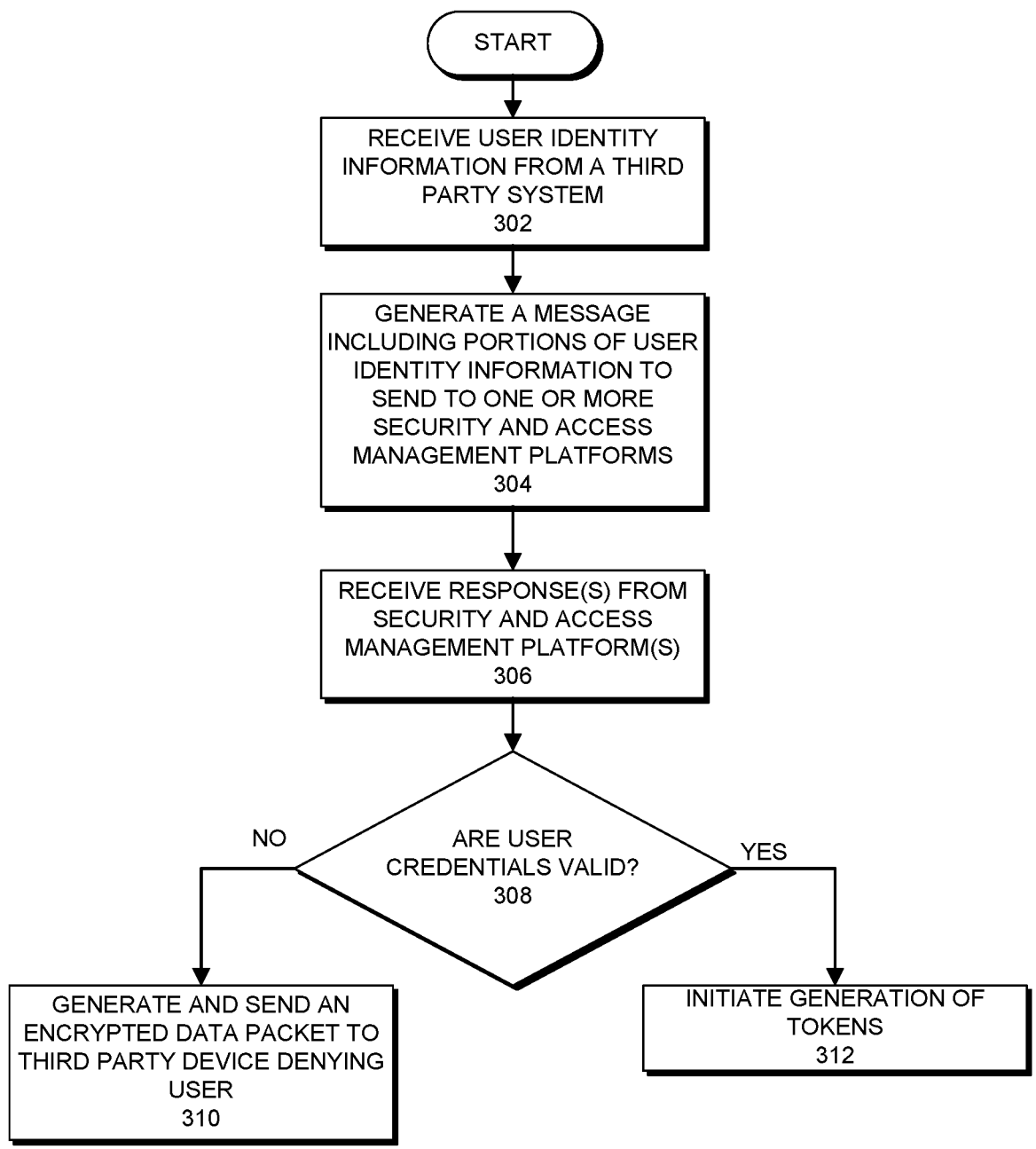
FIG. 3 is a block diagram illustrating an embodiment of a process of initiating of token generation.
Figure 4:
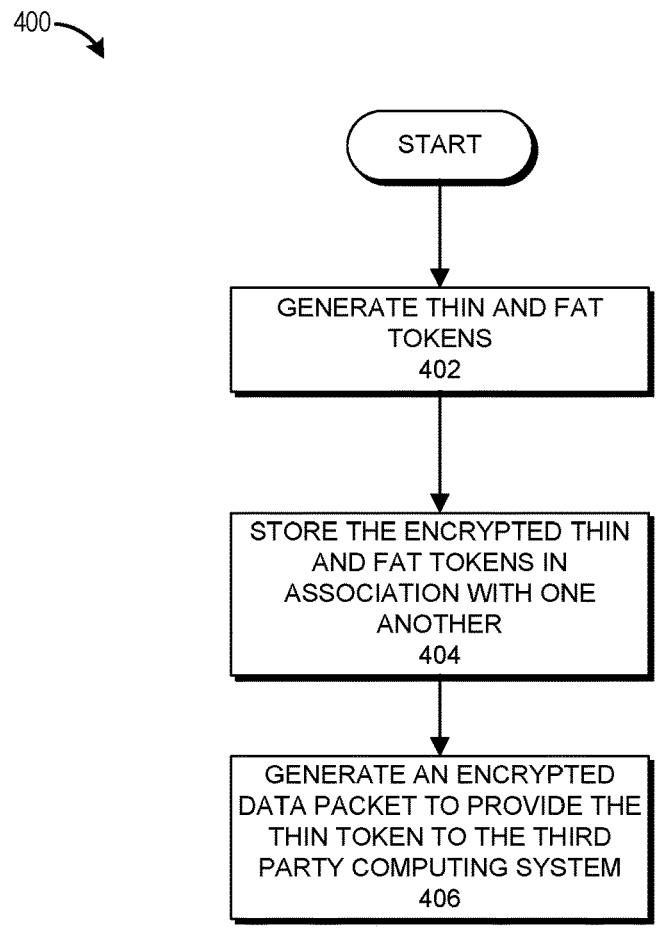
FIG. 4 is a block diagram illustrating an embodiment of a process for generating tokens.
Figure 5:
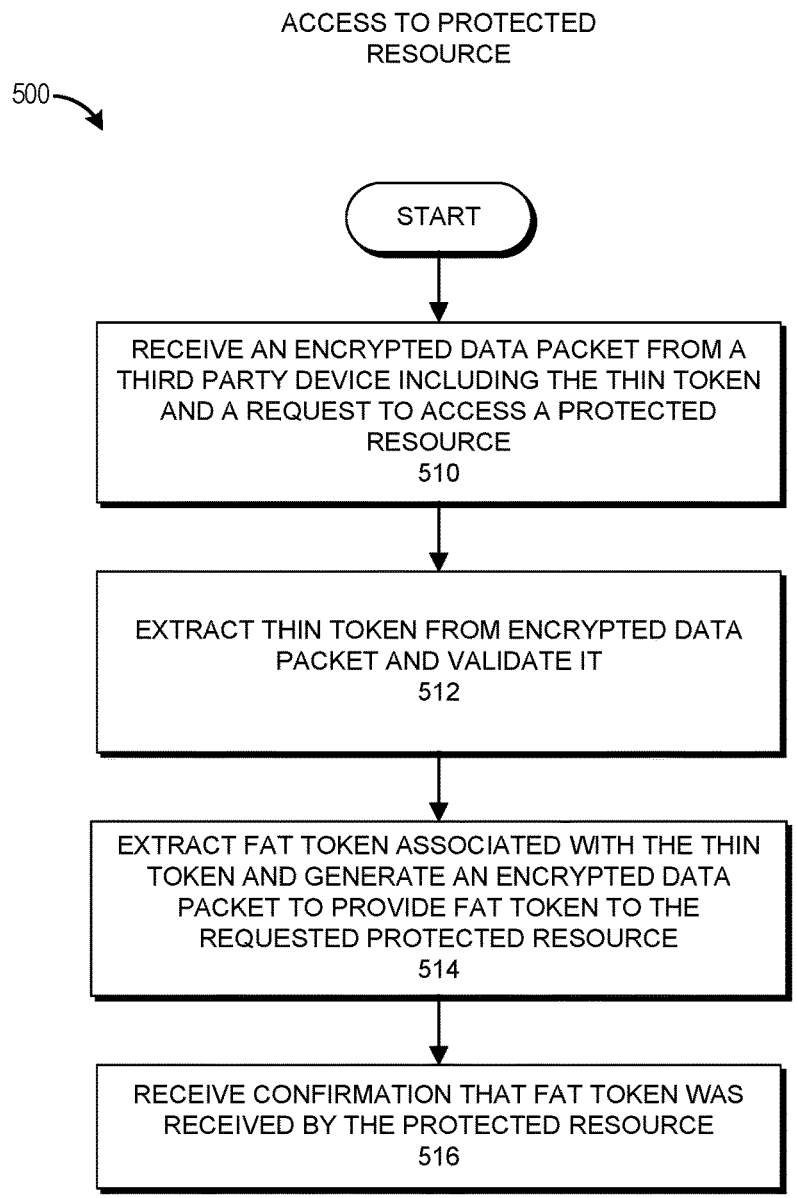
FIG. 5 is a block diagram illustrating an embodiment of a process for accessing authorization to protected resources.

FIGS. 3, 4, and 5 are flowcharts illustrating various embodiments of processes that execute within the token gateway environment. In some embodiments, the processes are performed by the gateway 170 and/or other components of the token gateway environment 100. However, it is recognized that other components of other systems (not shown) may perform one or more of the processes. For ease of explanation, the following describes the services as performed by the gateway 170. The example scenarios are intended to illustrate, but not to limit, various aspects of the computing environment. In some embodiments, the processes can vary from the illustrated flowcharts, with some blocks omitted and other added.

A. Token Generation Initiation Process

FIG. 3 is a block diagram illustrating an embodiment of a process of initiation of token generation.

In block 302, the gateway receives user identity information from a third party system. User identity information may include security information, for example, one or more of the user's username and password on one or more security and access management environments, the user's email addresses (for example, "username1 @email.com" and "username2@anotheremail.com"), zip codes associated with the user's addresses (for example, the user's address in the past 2 years), the user's phone numbers (for example, the user's work phone and home phone numbers), and the like. The request may be in an XML format, although other formats such as, for example, txt or HTML are also possible.

In block 304, the gateway receives a data packet storing the user credentials. In some embodiments, the gateway may first verify that the request is coming from a valid, trusted application. After the request is confirmed to be from a valid and trusted application, the gateway generates an encrypted message including portions of the user identity information to send to one or more of the security and access management platforms. Some example security and access management platforms include identity and access management platforms such as for example Okta, Centify, Microsoft Azure, RSA SecurID, OneLogin, LDAP, and the like.

The security and access management platform(s) process the user credentials to determine whether the user credentials are valid, and send a response back to the gateway.

In block 306, the gateway receives the one or more response(s) from the security and access management platform(s).

At block 308, the gateway determines if the security and access management platform(s) have verified the user credentials.

If the credentials were not validated, then, in block 310, the gateway generates and sends an encrypted data packet to the requesting user at the third party computing system denying authentication of the third party. In various scenarios, the third party environment may have rules regarding the number of attempts for authentication requests. Depending on such rules, the requesting user may then attempt to provide other credentials, and the flow may restart at block 302. Otherwise, the flow may end at block 310.

If the credentials were validated by the security and access management platform(s), then, in block 312, the gateway initiates the generation of tokens. One example embodiment of a process for token generation is shown in FIG. 4, and described in detail below.

B. Token Generation Process

FIG. 4 is a block diagram illustrating an embodiment of a process for token generation.

In some embodiments, the example process for token generation illustrated in FIG. 4 may be performed after the example process for token generation initiation illustrated in FIG. 3 is performed.

Following validation of credentials by one or more of the security and access management platforms, in block 402, the gateway generates a thin token and one or more fat tokens. As described above, the thin token includes a minimal or smaller set of information to send to the resource provider systems 171 to indicate that the user has been validated. The fat token may include additional details which are internal and specific to the protected resources.

After the tokens are generated, in block 404, the gateway stores the thin token and one or more fat tokens in association with one another. As described above, in one embodiment, the thin token is a key which points to the appropriate location in the cache where the associated fat token is stored. In various embodiments, for data security purposes, one or more of encoding, encryption, hashing, salting, and the like may be applied to the tokens.

In block 406, the gateway generates an encrypted data packet to provide the thin token to the third party computing system.

C. Access Authorization to Protected Resources Process

FIG. 5 is a block diagram illustrating an embodiment of a process for access authorization to protected resources.

In block 510, the gateway receives an encrypted data packet from a third party computing system including a thin token and a request to access a protected resource. In some embodiments, block 510 may immediately follow block 406. In other embodiments, block 510 may occur sometime after block 406 is completed.

In block 512, the gateway extracts the thin token from the encrypted data packet received, and validates the thin token.

In some embodiments, the extraction may be done using a JavaScript policy. Example details of an embodiment of the structure are provided in more detail below. The validation may include making sure that the thin token is signed, verified, its claims are not null, and that it has not expired.

After the thin token is validated, in block 514, the gateway accesses the fat token associated with the thin token, and generates an encrypted data packet to provide the fat token to the requested protected resource. In some embodiments, this accessing of the fat token includes extracting the JTI claim (described below) from the thin token. As described above, the fat token may include product information and other user information regarding, and used by, the resource provider systems 171 to provide the protected resource(s).

In block 516, the gateway receives confirmation that the fat token was received by the resource provider systems 171.

V. Token Headers and Data Structures

FIGS. 6A and 6B are block diagrams illustrating embodiments of token data structures.

A. Thin Token

FIG. 6A is a block diagram illustrating an example embodiment of a thin token data structure.

The following table provides more details about the data included in the header of the example embodiment of the thin token structure illustrated in FIG. 6A:

| Property | Description | Datatype | Example |
|---|---|---|---|
| alg | Identifies the digital signature used | String | "RS256" |
| kid | Identifies the public-key used to verify the access_token. | String | "AJjS1rPB7l80GZ82nclJVOBAwWpwe5XhjaSJeGRdwipF1" |
| typ | Type for the token, defaulted to "JWT". Specifies that this is a JWT token | String | "JWT" |

The following table provides more details about the data included in the payload of the example embodiment of the thin token structure illustrated in FIG. 6A:

| Property | Description | Datatype | Example |
|---|---|---|---|
| Sub | Username in security and access management platform | String | "abc@xyz.com" |
| Email | Email id of the user | String | "abc@xyz.com" |
| FirstName | First name of the user | String | "John" |
| Iss | Issuer of the token | String | "Credit Data Provider" |
| LastName | Last name of the user | String | "Doe" |
| Exp | The time at which the access token expires, in Unix time (seconds) | Integer | "1500462376" |
| Iat | The time at which the token was issued in Unix time (seconds) | Integer | "1500455176" |
| jti | Unique identifier for the access token. This is a Unique User Identifier ("UUID"). | String | "d277ff94-4c9f-4dcb-a4ad-59b56fbe41f0" |

The identifier value may be assigned in a manner that ensures that there is a negligible probability that the same value will be accidentally assigned to a different data object.

B. Fat Token

FIG. 6B is a block diagram illustrating an example embodiment of a fat token data structure.

The following table provides more details about the data included in the header of the example embodiment of the fat token structure illustrated in FIG. 6B:

| Property | Description | Datatype | Example |
|---|---|---|---|
| alg | Identifies the digital signature used | String | "RS256" |
| kid | Identifies the public-key used to verify the access_token. | String | "AJjS1rPB7l80GZ82nclJVOBAwWpwe5XhjaSJeGRdwipF1" |
| typ | Type for the token, defaulted to "JWT". Specifies that this is a JWT token. | string | "JWT" |

The following table provides more details about the data included in the payload of the example embodiment of the fat token structure illustrated in FIG. 6B:

| Property | Description | Datatype | Example |
|---|---|---|---|
| Sub | The username in security and access management platform | String | "abc@xyz.com" |
| Email | Email id of the user | String | "abc@xyz.com" |
| FirstName | The first name of the user | String | "John" |
| Iss | Issuer of the token | String | "Credit Data Provider" |
| LastName | The last name of the user | string | "Doe" |
| Exp | The time at which the access token expires, this is in Unix time (seconds) | Integer | "1500462376" |
| Iat | The time at which the token was issued in Unix time (seconds) | Integer | "1500455176" |
| UserProduct | The product name in security and access management platform | String | "Developer Portal non-prod" |
| UserProduct Options | These are the product options associated with the product in the UserProduct claim | JSON Array | "UserProductOptions": {"ProductOption": [ {"Name":"CEMS MARS User ID","value":"experian"}, {"Name":"CEMS Account Number","value":""}, {"Name":"CEMS MARS Password","value":"experian"}, {"Name":"CEMS Client ID","value":""}, {"Name":"CEMS Source IP","value":""} ]} |
| UserExtraInfo | Any custom information requested by the users and administrators of the protected resources | JSON Array | |

It is recognized that the user information may include user information from one or more security and access management systems. In other embodiments, there may be multiple fat tokens associated with each thin token.

C. Token Headers

FIGS. 7A, 7B, 7C and 7D are block diagrams illustrating embodiments of token headers.

1. Thin Token

FIG. 7A is a block diagram illustrating an embodiment of parameters of a header used in the process of a requesting user at a third party sending a request to access a protected resource after having received a thin token from the gateway. As seen in FIG. 7A, the header includes a parameter Client_id, a string which provides the client identification, a parameter Client_secret, a string which provides the client secret, which may in some examples be an encrypted key, and a parameter Content_type, a string which provides the payload type, such as for example JSON. In some embodiments, the payload may include the requesting user's username and password, for example.

The response sent back from the gateway to the requesting user may include an indication of the time the token has issued, time at which it will expire, the type of token, and finally the issuer of the token.

2. Refresh Process

FIG. 7B is a block diagram illustrating an embodiment of parameters of a header used in a refresh process of a third party user obtaining an updated thin token or a new access token.

As seen in FIG. 7B, the header includes the parameters Client_id, Client_secret and Content_type, which are similar to the parameters described above in FIG. 7A. In addition, the header for a refresh request additionally includes a parameter Grant_type, which is a string with the value "refresh_token" for example. Finally, the header also includes a parameter Refresh_token, which is the fresh token received by the gateway.

The process for the refresh would involve the third party user sending the refresh token request to the gateway, the gateway validating the Client_id and Client_secret, generating a refresh thin token (which could be the same token as previously generated but with updated parameters for the expiry time, for example), caching the refresh token in association with the previously generated fat token, and sending the refreshed token back to the third party user.

In some embodiments, the refresh token process may only refresh active thin tokens but could also update one or more fat tokens. For example, after being generated, the thin tokens may generally expire in 24 hours; however, a given thin token may only be active for 30 minutes. Thus, the refresh process may only refresh the thin token in those 30 minutes. However, the fat token may be refreshed after the 24 hours, when the thin token expires or it may be deleted entirely such that a new fat token may be generated using any security and access management environment 104A/104B updated information when the next thin token is generated.

3. Revoke Process

FIG. 7C is a block diagram illustrating an embodiment of parameters of a header used in the process of revoking a third party user's thin token (original or refreshed).

This process may be invoked, for example, when the third party user needs to log out of a given application, or out of their computing system. The third party may be an individual working at an organization, and the organization's administrator may also decide to log the individual out. For example, the third party administrator may wish to cut off access to protected resources for a terminated employee. In another example, the administrator may wish to end access for the entire organization.

As seen in FIG. 7C, the header includes the parameters Client_id and Client_secret, which are similar to the parameters described above in FIG. 7A. In addition, the header for a revoke token additionally includes a parameter Token, which identifies which token should be revoked, such as a unique identifier for the token such as the UUID. The identifier value may be assigned in a manner that ensures that there is a negligible probability that the same value will be accidentally assigned to a different data object. Finally, the header also includes a parameter Token_type, which is a string that has values of original, refresh, or JTI, for example.

When a requesting user decides to, or is made to log out, which would signal that the third party user hits the endpoint of their token valid time, the gateway again validates the Client_id and Client_secret. Then, depending on whether the token type is original or refresh, the gateway revokes the appropriate token only. At the same time, the gateway creates a new cache called for example "blacklistToken_Cache," which would persist the blacklisted token. The expiry time of the cache will be the same as the refresh token expiry time. If the token type is JTI, then the gateway revokes all original and refresh tokens, or JTI tokens. This may cause the third party to be entirely logged out of an application, for example.

In various embodiments, the revoke process may be invoked by a specific application on a third party user computing system, in which case the revocation of the thin token would cause the user to be logged out of the specific applications. In other embodiments, the administrator of the third party environment may wish to revoke thin tokens for all users at once such as for example revoking all tokens with a specific client identifier—and the revoke process may be used for that as well.

4. Product Token

FIG. 7D is a block diagram illustrating an embodiment of parameters of a header of a product token.

The illustrated token includes a product identifier such as a name or unique ID and then an indication of which security and access management provider handles the user authentication for the product.

VI. Example Applications

In one example, an employee of Bank X wants to get credit report of consumer Y. The employee of Bank X also wants to get a fraud score for consumer Y. The employee tries to log in to Bank X's application providing credit reports and fraud score from the employee's tablet using a username and password. Gateway 170 receives from the employee of Bank X the employee's username and password, along with a request for these two types of resources.

Gateway 170 then determines the employee's security information, and then contacts security and access management environment 104A to determine if the employee of Bank X is authenticated and has correct privilege for accessing a credit report of consumer Y. Gateway 170 also contacts security and access management environment 104B to determine if the employee of Bank X is authenticated and has correct privilege for getting a fraud score for consumer Y.

After security and access management environment 104A and security and access management environment 104B confirm that the employee of Bank X is authenticated to access both credit reports and fraud scores regarding consumer Y, then gateway 170 creates a single thin token for the employee, and a fat token for each of the employee's requests (credit report for consumer Y and fraud score for consumer Y) using data from the security and access management environment 104A and security and access management environment 104B. The gateway also stores the thin token in association with the two fat tokens in the token repository in a key-value cache scheme. Though in other embodiments, the fat token includes data from both security and access management environment 104A and security and access management environment 104B.

Then the gateway 170 sends the thin token back to the employee's tablet. Then, the employee sends a request for accessing the resources back to the gateway 170, after which, the gateway 170 validates the thin token and then retrieves the appropriate fat tokens associated with it, and forwards the fat tokens (which include private data from the security and access management environment 104A and security and access management environment 104B) to the resource provider systems 171, in this case, a credit report provider system, and a fraud analytics provider system. The resource provider systems then send confirmation of receipt to the gateway.

VII. Example System Implementation and Architecture

In some embodiments, any of the systems, servers, or components referenced herein including the token provider repository system 130, the gateway 170, the computing systems 146A, 146B, 164A, 164B, the resource provider systems 171 may take the form of a computing system as shown in FIG. 8 which illustrates a block diagram of an embodiment of a computing device 800. The computing device 800 may include, for example, one or more personal computers that is IBM, Macintosh, or Linux/Unix compatible or a server or workstation. In one embodiment, the computing device 800 comprises a server, a laptop computer, a smart phone, a personal digital assistant, a tablet, or a desktop computer, for example. In one embodiment, the illustrated computing device 800 includes one or more central processing unit (CPU) 802, which may each include a conventional or proprietary microprocessor. The computing device 800 further includes one or more memory 806, such as random access memory (RAM) for temporary storage of information, one or more read only memory (ROM) for permanent storage of information, and one or more mass storage device 810, such as a hard drive, diskette, solid state drive, or optical media storage device. The computing device 800 may also include a token module 808 which performs one or more of the processed discussed herein. Typically, the components of the computing device 800 are connected to the computer using a standard based bus system. In different embodiments, the standard based bus system could be implemented in Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of computing device 800 may be combined into fewer components and modules or further separated into additional components and modules.

The computing device 800 is generally controlled and coordinated by operating system software, such as Windows XP, Windows Vista, Windows 7, Windows 8, Windows 10, Windows Server, Unix, Linux, SunOS, Solaris, Blackberry OS, or other compatible operating systems. In Macintosh systems, the operating system may be any available operating system, such as iOS or MAC OS X. In other embodiments, the computing device 800 may be controlled by a proprietary operating system. Conventional operating systems control and schedule computer processes for execution, perform memory management, provide file system, networking, I/O services, and provide a user interface, such as a graphical user interface (GUI), among other things.

The illustrated computing device 800 may include one or more commonly available input/output (I/O) devices and interfaces 804, such as a keyboard, mouse, touchpad, and printer. In one embodiment, the I/O devices and interfaces 804 include one or more display devices, such as a monitor, that allows the visual presentation of data to a user. More particularly, a display device provides for the presentation of GUIs, application software data, reports, benchmarking data, metrics, and/or multimedia presentations, for example. The computing device 800 may also include one or more multimedia devices 812, such as speakers, video cards, graphics accelerators, and microphones, for example.

In the embodiment of FIG. 8, the I/O devices and interfaces 804 provide a communication interface to various external devices. In the embodiment of FIG. 8, the computing device 800 is electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the ERP data sources.

In some embodiments, information may be provided to the computing device 800 over a network from one or more data sources. The data sources may include one or more internal and/or external data sources. In some embodiments, one or more of the databases or data sources may be implemented using a relational database, such as Sybase, Oracle, CodeBase, PostgreSQL, and Microsoft® SQL Server as well as other types of databases such as, for example, a flat file database, an entity-relationship database, an object-oriented database, a non-relational database, and/or a record-based database.

In general, the word "module," as used herein, refers to logic embodied in hardware or firmware, or to a collection of software instructions, possibly having entry and exit points, written in a programming language, such as, for example, Java, Lua, C, C#, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 800, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example of FIG. 8, the modules 808 and 814 may be configured for execution by the CPU 802 to perform any or all of the processes discussed herein. Depending on the embodiment, certain processes, or in the processes, or groups of processes discussed herein may be performed by multiple devices, such as multiple computing systems similar to computing device 800.

VIII. Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electro-mechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The invention claimed is:

1. A system for providing tokens to facilitate authentication and access to protected resources, the system comprising:
    a token gateway computing system in electronic communication with a third party user computing system; at least one security and access management computing system; a token management computing system; and a protected resource computing system,
    wherein the token gateway computing system is configured to:
        receive, from the third party user computing system, an encrypted data packet including user credentials of a third party user and a request for an authentication token to access one or more protected resources from the protected resource computing system;
        decrypt and parse the received encrypted data packet to extract the third party user's security information and to determine a type associated with each of the one or more protected resources requested;
        transmit an encrypted data packet to the at least one security and access management computing system based on the determined type, wherein the encrypted data packet includes the third party user's security information and a request for user validation;
        receive, from the at least one security and access management computing system, validation of the third party user, and private data;
        generate a thin token;
        generate a fat token using the private data;
        store the thin token in association with the fat token in the token management computing system;
        transmit the thin token to the third party user computing system;
        receive, from the third party user computing system, a request to access one or more protected resources from the protected resource computing system, the request comprising the thin token;
        validate the received thin token;
        access the fat token associated with the thin token in the token management computing system; and
        transmit the fat token to the protected resource computing system,
    wherein the thin token and the fat token are based on a JavaScript Object Notation (JSON) web token standard;
    wherein the thin token payload includes at least a username, an email, a first name, an issuer of the token, a last name, an expiry time, an issue time, and a unique identifier; and
    wherein the fat token payload comprises the thin token payload and additional data.

2. The system of claim 1, wherein the thin token and fat token headers each include a public key and a type associated with the token.

3. The system of claim 1, wherein the additional data in the fat token payload include details regarding the protected resources.

4. The system of claim 1, wherein the additional data includes:
    a product name of a protected resource as identified in the at least one security and access management platform;
    product options associated with the product name;
    additional custom information requested by users and administrators of the protected resource computing system.

5. The system of claim 1, wherein the thin token includes a key pointing to the fat token.

6. The system of claim 1, wherein the token gateway computing system is further configured to:
    receive, from the third party user computing system, a request for a refreshed thin token;
    validate a header within the request;
    generate a refreshed thin token;
    store the refreshed token in association with a previously generated thin token; and
    send the refreshed token back to the third party user computing system.

7. The system of claim 6, wherein the previously generated thin token includes an expiry date.

8. A computer-implemented method for providing tokens to facilitate authentication and access to protected resources, the computer-implemented method comprising, as implemented by one or more computing devices within a token gateway system configured with specific executable instructions:
    receiving, from a third party user computing system, an encrypted data packet including user credentials of a third party user and a request for an authentication token to access one or more protected resources from a protected resource computing system;
    decrypting and parsing the received encrypted data packet to extract the third party user's security information and to determine a type associated with each of the one or more protected resources requested;
    transmitting an encrypted data packet to at least one security and access management computing system based on the determined type, wherein the encrypted data packet includes the third party user's security information and a request for user validation;
    receiving, from the at least one security and access management computing system, validation of the third party user, and private data;
    generating a thin token;
    generating a fat token using the private data;
    storing the thin token in association with the fat token in the token management computing system;
    transmitting the thin token to the third party user computing system;

receiving, from the third party user computing system, a request to access one or more protected resources from the protected resource computing system, the request comprising the thin token;

validating the received thin token;

accessing the fat token associated with the thin token in a token management computing system; and transmitting the fat token to the protected resource computing system wherein the thin token and the fat token are based on a JavaScript Object Notation (JSON) web token standard;

wherein the thin token payload includes at least a username, an email, a first name, an issuer of the token, a last name, an expiry time, an issue time, and a unique identifier; and wherein the fat token payload comprises the thin token payload and additional dat.

9. The method of claim 8, wherein the thin token and fat token headers each include a public key and a type associated with the token.

10. The method of claim 8, wherein the additional data in the fat token payload include details regarding the protected resources.

11. The method of claim 8, wherein the additional data includes:
a product name of a protected resource as identified in the at least one security and access management platform;
product options associated with the product name;
additional custom information requested by users and administrators of the protected resource computing system.

12. The method of claim 8, wherein the thin token includes a key pointing to the fat token.

13. The method of claim 8 further comprising:
receiving, from the third party user computing system, a request for a refreshed thin token;
validating a header within the request;
generating a refreshed thin token;
storing the refreshed token in association with a previously generated thin token; and
sending the refreshed token back to the third party user computing system.

14. The method of claim 13, wherein the previously generated thin token includes an expiry date.

15. A non-transitory computer storage medium storing computer-executable instructions that, when executed by a processor, cause the processor to at least:
receive, from a third party user computing system, an encrypted data packet including user credentials of a third party user and a request for an authentication token to access one or more protected resources from a protected resource computing system;
decrypt and parse the received encrypted data packet to extract the third party user's security information and to determine a type associated with each of the one or more protected resources requested;
transmit an encrypted data packet to at least one security and access management computing system based on the determined type, wherein the encrypted data packet includes the third party user's security information and a request for user validation;
receive, from the at least one security and access management computing system, validation of the third party user, and private data;
generate a thin token;
generate a fat token using the private data;
store the thin token in association with the fat token in the token management computing system;
transmit the thin token to the third party user computing system;
receive, from the third party user computing system, a request to access one or more protected resources from the protected resource computing system, the request comprising the thin token;
validate the received thin token;
access the fat token associated with the thin token in a token management computing system; and
transmit the fat token to the protected resource computing system,
wherein the thin token and the fat token are based on a JavaScript Object Notation (JSON) web token standard;
wherein the thin token payload includes at least a username, an email, a first name, an issuer of the token, a last name, an expiry time, an issue time, and a unique identifier; and
wherein the fat token payload comprises the thin token payload and additional data.

16. The non-transitory computer storage medium of claim 15, wherein the thin token includes a key pointing to the fat token.

17. The non-transitory computer storage medium of claim 15, wherein the computer-executable instructions, when executed by the processor, cause the processor to additionally:
receive, from the third party user computing system, a request for a refreshed thin token;
validate a header within the request;
generate a refreshed thin token;
store the refreshed token in association with a previously generated thin token; and
send the refreshed token back to the third party user computing system.

18. The non-transitory computer storage medium of claim 17, wherein the previously generated thin token includes an expiry date.

19. The non-transitory computer storage medium of claim 18, wherein the refreshed token includes a different expiry date than the expiry date of the previously generated thin token.

20. The non-transitory computer storage medium of claim 15, wherein the computer-executable instructions, when executed by the processor, cause the processor to additionally:
receive, from the third party user computing system, a request to revoke the thin token;
validate a header within the request;
revoke the thin token; and
alter a stored version of a previously generated thin token.

* * * * *